(12) United States Patent
Cullinane et al.

(10) Patent No.: US 8,899,557 B2
(45) Date of Patent: Dec. 2, 2014

(54) IN-LINE DEVICE FOR GAS-LIQUID CONTACTING, AND GAS PROCESSING FACILITY EMPLOYING CO-CURRENT CONTACTORS

(75) Inventors: John T Cullinane, Missouri City, TX (US); Edward J Grave, Spring, TX (US); Paul S. Northrop, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 387 days.

(21) Appl. No.: 13/189,201

(22) Filed: Jul. 22, 2011

(65) Prior Publication Data

US 2012/0238793 A1 Sep. 20, 2012

Related U.S. Application Data

(63) Continuation-in-part of application No. 13/119,356, filed on Mar. 16, 2011.

(51) Int. Cl.
| | | |
|---|---|---|
| *B01F 3/04* | (2006.01) | |
| *B01D 47/00* | (2006.01) | |
| *B01D 19/00* | (2006.01) | |
| *B01D 53/18* | (2006.01) | |
| *B01D 3/14* | (2006.01) | |
| *B01D 53/26* | (2006.01) | |

(52) U.S. Cl.
CPC .......... *B01D 19/0036* (2013.01); *B01D 53/18* (2013.01); *C01L 3/103* (2013.01); *C01L 3/106* (2013.01); *B01D 3/14* (2013.01); *B01D 53/263* (2013.01); *B01D 2252/2023* (2013.01); *B01D 2256/24* (2013.01); *B01D 2257/80* (2013.01)
USPC .................................. 261/76; 96/234; 96/355

(58) Field of Classification Search
USPC ................ 96/234, 355, 361; 261/76; 585/833
See application file for complete search history.

(56) References Cited

U.S. PATENT DOCUMENTS 1,951,647 A * 3/1934 Cooke .............................. 196/46
3,767,766 A 10/1973 Tjoa et al. ...................... 423/220
(Continued)

FOREIGN PATENT DOCUMENTS

EP 0191985 8/1986 ............. B01D 53/18
EP 0301623 2/1989 ............. B01D 53/14
(Continued)

OTHER PUBLICATIONS

Carter, T. et al. (1998) "Addition of Static Mixers Increases Capacity in Central Texas Gas Plant," *Proceedings of the 77th GPA Ann. Conv.*, pp. 110-113.
(Continued)

*Primary Examiner* — Robert A Hopkins
(74) *Attorney, Agent, or Firm* — ExxonMobil Upstream Research Company Law Department

(57) ABSTRACT

Provided are gas processing facilities for the separation of components in a gas stream and methods of using the same. The facility includes one or more co-current contactors. Each contactor includes a mass transfer vessel having a mixing section. The mixing section receives a gas stream and a liquid contacting stream. The mixing section mixes theses two streams and releases a two-phase flow. Each contactor also includes a separator that receives the two-phase fluid stream from the mass transfer vessel in-line, and then separates a vapor phase from a liquid phase. The separator has a gas-phase outlet configured to release the vapor phase as a treated gas stream, and a liquid-phase outlet configured to release the liquid phase as a loaded treating solution. The contactors may be used to remove water or other contaminant from a natural gas stream or other gas stream.

33 Claims, 7 Drawing Sheets

(56) References Cited

U.S. PATENT DOCUMENTS

| | | | |
|---|---|---|---|
| 3,773,472 A * | 11/1973 | Hausberg et al. | 422/169 |
| 4,073,832 A | 2/1978 | McGann | 261/118 |
| 4,369,167 A | 1/1983 | Weir | 423/210 |
| 4,678,648 A | 7/1987 | Wynn | 423/228 |
| 4,752,307 A | 6/1988 | Asmus et al. | 55/73 |
| 4,824,645 A | 4/1989 | Jones et al. | 423/226 |
| 4,885,079 A | 12/1989 | Eppig et al. | 208/13 |
| 5,067,971 A | 11/1991 | Bikson et al. | 55/16 |
| 5,186,836 A | 2/1993 | Gauthier et al. | 210/512.1 |
| 5,209,821 A | 5/1993 | Shaw et al. | 159/4.01 |
| 5,439,509 A | 8/1995 | Spink et al. | 95/166 |
| 5,462,584 A | 10/1995 | Gavlin et al. | 95/231 |
| 5,603,908 A | 2/1997 | Yoshida et al. | 423/220 |
| 5,648,053 A | 7/1997 | Mimura et al. | 423/210 |
| 5,664,426 A | 9/1997 | Lu | 62/93 |
| 5,837,105 A | 11/1998 | Stober et al. | 203/40 |
| 5,907,924 A | 6/1999 | Collin et al. | 45/194 |
| 5,988,283 A | 11/1999 | Gann | 166/357 |
| 6,071,484 A | 6/2000 | Dingman et al. | 423/229 |
| 6,089,317 A | 7/2000 | Shaw | 166/265 |
| 6,228,145 B1 | 5/2001 | Falk-Pedersen et al. | 95/44 |
| 6,881,389 B2 | 4/2005 | Paulsen et al. | 423/210 |
| 7,018,451 B1 | 3/2006 | Torkildsen et al. | 95/216 |
| 7,128,276 B2 | 10/2006 | Nilsen et al. | 236/124 |
| 7,144,568 B2 | 12/2006 | Ricard et al. | 423/659 |
| RE39,826 E | 9/2007 | Lu | 62/632 |
| 7,273,513 B2 | 9/2007 | Linga et al. | 95/235 |
| 7,811,343 B2 | 10/2010 | Toma | 55/318 |
| 8,343,360 B2 | 1/2013 | Schook | 210/788 |
| 2003/0005823 A1 | 1/2003 | Le Blanc et al. | 95/149 |
| 2004/0092774 A1 | 5/2004 | Mimura et al. | 564/497 |
| 2006/0123993 A1 | 6/2006 | Henriksen | 96/234 |
| 2008/0006011 A1 | 1/2008 | Larnholm et al. | 55/421 |
| 2008/0107581 A1 | 5/2008 | Sparling et al. | 423/222 |
| 2008/0257788 A1 | 10/2008 | Leito | 209/44 |
| 2009/0241778 A1 | 10/2009 | Lechnick et al. | 95/177 |
| 2010/0229725 A1 | 9/2010 | Farsad et al. | 96/74 |
| 2011/0168019 A1 | 7/2011 | Northrop et al. | 95/186 |
| 2011/0185633 A1 | 8/2011 | Betting et al. | 48/127.5 |
| 2012/0238793 A1 | 9/2012 | Cullinane et al. | 585/833 |
| 2012/0279728 A1 | 11/2012 | Northrop et al. | 166/401 |

FOREIGN PATENT DOCUMENTS

| | | | |
|---|---|---|---|
| EP | 1021237 | 3/1999 | |
| EP | 1141520 | 5/2003 | |
| GB | 1234862 | 6/1971 | B01D 53/18 |
| WO | WO97/46304 | 12/1997 | |
| WO | WO99/13966 | 3/1999 | B01D 53/18 |
| WO | WO2000/056844 | 9/2000 | |
| WO | WO03/072226 | 9/2003 | B01D 53/14 |
| WO | WO2004/070297 | 8/2004 | |
| WO | WO2006/038810 | 4/2006 | |

OTHER PUBLICATIONS

Linga, H. et al. (2001) "New Selective $H_2S$ Removal Process for the Refining Industry," *Nat'l Petrochemcial & Refiners Assoc.*, AM-01-35, 9 pages.

Linga, H. et al. (2006) "Potentials and Applications for the Pro-Pure Co-Current Contactors," *13th Annual India Oil & Gas Rev. Symp.*, Mumbai, Indi, 23 pages.

Nilsen, F. et al. (2001) "Selective $H_2S$ Removal in 50 Milliseconds," *Gas Processors Assoc. Europe Ann. Conf.*, 12 pages.

Nilsen, F. et al. (2002) "Novel Contacting Technology Selectively Removes $H_2S$," *Oil & Gas Journal*, 10 pages.

PCT Int'l Search & Written Opinion dtd Oct. 20, 2009, 12 pgs.

Nilsen, F. et al. (2002) "Selective $H_2S$ Removal Applications Using Novel Contacting Technology," *Gas Processors Assoc.*, 13 pgs.

Schutte & Koerting (2012) "Gas Scrubbers," *Product Brochure*, 14 pgs.

ProSep Inc. (2007) "Selective $H_2S$-Removal With Amines (ProCap)," *Product Brochure*, 32 pgs.

ProSep Inc. (2014) "ProDry," *Gas Portfolio Product Brochure*, 1 pg.

ProSep Inc. (2014) "ProScav," *Gas Portfolio Product Brochure*, 1 pg.

\* cited by examiner

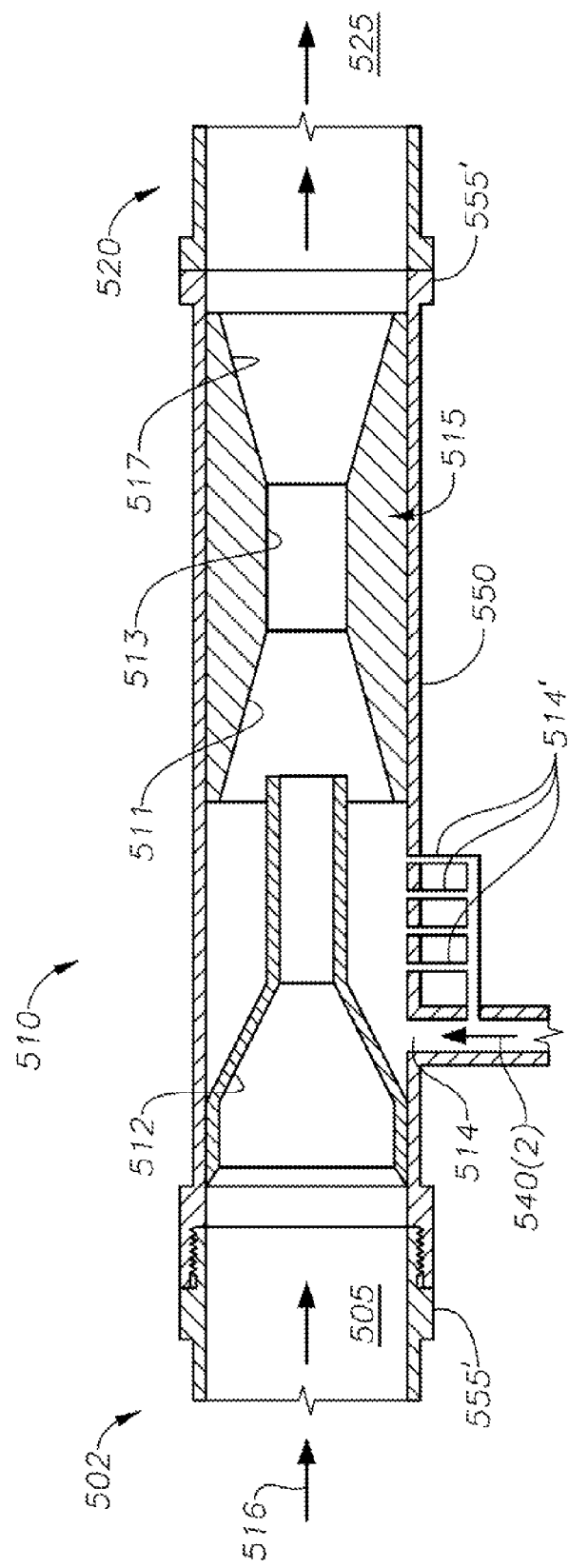

US 8,899,557 B2

IN-LINE DEVICE FOR GAS-LIQUID CONTACTING, AND GAS PROCESSING FACILITY EMPLOYING CO-CURRENT CONTACTORS

STATEMENT OF RELATED APPLICATIONS

This application is a continuation in part of U.S. National Phase patent application Ser. No. 13/119,356 filed Mar. 16, 2011 entitled "Removal of Acid Gases From A Gas Stream" which claims priority to U.S. Provisional Patent Application No. 61/105,343, filed Oct. 14, 2008 and entitled "Removal of Acid Gases From a Gas Stream," which are each incorporated herein by reference.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present invention relates to the field of fluid separation. More specifically, this invention relates to the purification of natural gas, or other gas streams, containing one or more impurities using in-line contacting devices.

DISCUSSION OF TECHNOLOGY

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ or $CO_2$ are produced as part of a hydrocarbon gas stream (such as methane or ethane), the raw gas stream is sometimes referred to as "sour gas." The $H_2S$ and $CO_2$ are often referred to together as "acid gases."

In addition to hydrocarbon production streams, acid gases may be associated with synthesis gas streams, or with refinery gas streams. Acid gases may also be present within so-called flash-gas streams in gas processing facilities. Further, acid gases may be generated by the combustion of coal, natural gas, or other carbonaceous fuels.

Gas streams may contain not only $H_2S$ or $CO_2$, but may also contain other "acidic" impurities. These include mercaptans and other trace sulfur compounds ($SO_x$). In addition, natural gas streams may contain water. Indeed, water is the most common contaminant in many natural gas streams. Such impurities should be removed prior to industrial or residential use.

Processes have been devised to remove contaminants from a raw natural gas stream. In the case of acid gases, cryogenic gas processing is sometimes used, particularly to remove $CO_2$ to prevent line freezing and plugged orifices. In other instances, particularly with $H_2S$ removal, the hydrocarbon fluid stream is treated with a solvent. Solvents may include chemical solvents such as amines. Examples of amines used in sour gas treatment include monoethanol amine (MEA), diethanol amine (DEA), and methyl diethanol amine (MDEA).

Physical solvents are sometimes used in lieu of amine solvents. Examples include Selexol® and Rectisol™. In some instances hybrid solvents, meaning mixtures of physical and chemical solvents, have been used. An example is Sulfinol®. However, the use of amine-based acid gas removal solvents is most common.

Amine-based solvents rely on a chemical reaction with the acid gases. The reaction process is sometimes referred to as "gas sweetening." Such chemical reactions are generally more effective than the physical-based solvents, particularly at feed gas pressures below about 300 psia (2.07 MPa). There are instances where special chemical solvents such as Flexsorb™ are used, particularly for selectively removing $H_2S$ from $CO_2$-containing gas streams.

As a result of the gas sweetening process, a treated or "sweetened" gas stream is created. The sweetened gas stream is substantially depleted of $H_2S$ and/or $CO_2$ components. The sweetened gas can be further processed for liquids recovery, that is, by condensing out heavier hydrocarbon gases. The sweet gas may be sold into a pipeline or may be used for liquefied natural gas (LNG) feed if the $CO_2$ concentration is less than, for example, about 50 ppm. In addition, the sweetened gas stream may be used as feedstock for a gas-to-liquids process, and then ultimately used to make waxes, butanes, lubricants, glycols and other petroleum-based products. The extracted $CO_2$ may be sold, or it may be injected into a subterranean reservoir for enhanced oil recovery operations.

When a natural gas stream contains water, a dehydration process is usually undertaken before acid gas removal. This is done through the use of glycol or other desiccant in a water separator. The dehydration of natural gas is done to control the formation of gas hydrates and to prevent corrosion in distribution pipelines. The formation of gas hydrates and corrosion in pipelines can cause a decrease in flow volume as well as frozen control valves, plugged orifices and other operating problems.

Traditionally, the removal of acid gases or water using chemical solvents or desiccants involves counter-currently contacting the raw natural gas stream with the chemical. The raw gas stream is introduced into the bottom section of a contacting tower. At the same time, the solvent solution is directed into a top section of the tower. The tower has trays, packings, or other "internals." As the liquid solvent cascades through the internals, it absorbs the undesirable components, carrying them away through the bottom of the contacting tower as part of a "rich" solvent solution. At the same time, gaseous fluid that is largely depleted of the undesirable components exits at the top of the tower.

The rich solvent or rich glycol, as the case may be, that exits the contactor is sometimes referred to as an absorbent liquid. Following absorption, a process of regeneration (also called "desorption") may be employed to separate contaminants from the active solvent of the absorbent liquid. This produces a "lean" solvent or a "lean" glycol that is then typically recycled into the contacting tower for further absorption.

As an example, FIG. 1 provides a schematic view of a known gas processing facility for the removal of water from a raw gas stream. An illustrative tower for counter-currently contacting water with lean solvent is seen at 116. The vigorous contacting between the raw gas stream and the liquid solvent within the tower 116 permits water to be absorbed by the solvent. The facility of FIG. 1 is discussed in greater detail below.

Known counter-current contactor vessels (such as tower 116) used for dehydration or for $H_2S$ and $CO_2$ absorption tend to be very large and heavy. This creates particular difficulty in offshore oil and gas production applications where smaller equipment is desirable. Further, the transport and set-up of large tower-based facilities is difficult for shale gas production operations that frequently take place in remote locations. Accordingly, a need exists for an improved gas processing facility useful for the removal of undesirable components from hydrocarbon gas streams incident to oil and gas recovery that employs smaller contacting devices. In addition, a need exists for a gas processing facility that employs smaller co-current contactors that do not primarily rely upon gravity for the separation of two-phase fluids. Further, a need exists for an improved co-current contactor that rapidly separates water or a selected acid gas component from a fluid stream and which is not significantly susceptible to offshore wave motions.

SUMMARY OF THE INVENTION

A gas processing facility is first provided for the separation of components in a gas stream. The gas stream may be, for example, a gas stream from a hydrocarbon recovery operation, including raw natural gas recovered from an offshore reservoir and shale gas produced on-shore. Alternatively, the gas stream may be a flue gas stream from an industrial plant, or a flash-gas stream created within a gas processing facility. Alternatively still, the gas stream may be a tail gas stream from a Claus sulfur recovery process, an acid gas stream from a solvent regeneration process requiring $H_2S$ enrichment, or a synthesis-gas stream. The components to be separated out may be, for example, water, carbon dioxide, hydrogen sulfide, or combinations thereof.

In one aspect, the gas processing facility includes one or more contactors placed in series. The term "in series" means that the contactors are configured along a flow line such that the fluid stream undergoing separation moves from one contactor to the next while maintaining flow in a substantially constant downstream direction.

In one embodiment, each co-current contactor receives a gas stream that includes water. Alternatively, each co-current contactor receives a gas stream that includes an acid gas component. Each co-current contactor also receives a liquid contacting stream, or solvent.

Where the operator desires to remove water, the liquid contacting stream is a desiccant stream, such as triethylene glycol. Where the operator desires to remove an acid gas component, the liquid contacting stream is preferably a chemical absorbent such as amine. In any instance, the co-current contactors each release a treated gas stream and a separate gas-treating solution. In one processing direction, the contactors are arranged to deliver progressively treated gas streams. In the opposite processing direction, the contactors are arranged to deliver progressively richer gas-treating solutions.

The facility may include a first co-current contactor and at least a final co-current contactor. Any number of intermediate co-current contactors, i.e., a second contactor, a third contactor, etc. may be employed in series to further remove an impurity (such as water) from the fluid stream. Where the fluid stream is a natural gas stream, the number of contactors employed in series is dependent on the concentration of water (or other contaminant) in the original gas stream and the degree of desired removal, or "treating," desired.

In one aspect, the first co-current contactor is configured to receive (i) an initial gas stream containing a hydrocarbon gas and the undesirable component and (ii) a second liquid solvent. The second liquid solvent is generated by a subsequent contactor in the series, which may be either a second contactor or, if only two contactors are used, a final contactor. If only one of the novel contactors is used, the subsequent contactor may actually be a solvent regenerator. The first contactor is also configured to release (iii) a first partially-treated gas stream and (iv) a rich gas-treating solution.

The facility optionally includes a second co-current contactor in series with the first and final contactors. The second contactor is configured to receive (i) the first partially-treated gas stream from the first contactor, and (ii) a third liquid solvent. The third liquid solvent is generated by a subsequent contactor in the series, which may be either a fourth contactor or, if only three contactors are used, the final contactor or a solvent regenerator. The second contactor is also configured to release (iii) a second partially-treated gas stream and (iv) a second partially-rich gas treating solution. In this instance, the second partially-rich gas treating solution comprises the second liquid solvent.

The final contactor is in series with the first contactor and any other contactors optionally employed intermediate to the first contactor and the final contactor. An example would be the second contactor. The final co-current contactor is configured to receive (i) a subsequent treated gas stream and (ii) a regenerated lean liquid solvent. The subsequent contactor is also configured to release (iii) a final treated gas stream and (iv) a final lightly-loaded gas-treating solution. Where only the second contactor is used intermediate to the first and final contactors, the subsequent treated gas stream received by the final contactor is the second partially-treated gas stream released by the second contactor. Of course, where additional contactors are used, the subsequent treated gas stream is the treated gas stream from the penultimate contactor in series prior to the final contactor.

The present inventions are not limited by the number of co-current contactors used to produce the final treated gas stream unless otherwise stated in the claims. Indeed, only one of the novel co-current contactors described herein may be employed. In other embodiments, three, four or more contactors may be used.

The facility preferably further includes a liquid solvent regenerator. The regenerator is configured to receive at least the first partially-rich gas treating solution, and to produce the regenerated or lean liquid solvent stream. The regenerated liquid solvent stream received by the final co-current contactor is comprised at least in part of the regenerated liquid solvent stream whereby a contaminant has been substantially removed from at least the first partially-rich gas treating solution.

In one aspect, the contaminant undergoing separation is hydrogen sulfide. In this instance, the second liquid solvent and the regenerated liquid solvent are selected to remove hydrogen sulfide from the gas stream. It is understood that $H_2S$ and $CO_2$ may be absorbed through separate processes that are performed sequentially. Typically, the $H_2S$ component is removed first using an $H_2S$-selective amine solvent. In any instance, the treated gas streams released by the contactors are sweetened gas streams.

In another aspect, the contaminant to be removed is water. In this instance, the second liquid solvent and the regenerated liquid solvent are a desiccant solution.

In any case, each co-current contactor includes a mass transfer vessel. The mass transfer vessel has a first end and a second end. The contactor also includes a first inlet configured to receive the initial gas stream proximate the first end of the mass transfer vessel, and a second inlet configured to receive a liquid contacting stream also proximate the first end of the mass transfer vessel.

Each co-current contactor also includes a mixing section within the mass transfer vessel. The mixing section is configured to receive the fluid stream and the liquid contacting stream, and to provide a mixed, two-phase flow. In one aspect, the mixing section comprises an eductor having (i) a mixing chamber that receives the gas stream and the liquid contacting stream, (ii) a throat defining an elongated reduced-diameter portion, and (iii) a diffuser having an expanded diameter that releases the mixed, two-phase flow.

Each contactor further includes a separator. The separator is proximate the second end of the mass transfer vessel, and is configured to receive the two-phase fluid stream from the mixing section. The separator is "in-line" with the mass transfer vessel, and separates a vapor phase from a liquid phase. The separator includes a gas-phase outlet configured to release the vapor phase as a treated gas stream, and a liquid-phase outlet configured to release the liquid phase as a rich treating solution.

It is preferred that the mixing section and the separator be designed to separate fluid components without substantially relying upon gravity separation. Further, it is preferred that each of the mass transfer vessels comprises an elongated tubular body configured to be connected in-line with a flow line, and that each of the separators also comprises an elongated tubular body configured to be connected in-line with the flow line.

In one embodiment, each of the co-current contactors further comprises an intermediate mass transfer volume. The mass transfer volume is configured to receive the mixed, two-phase flow from the respective mixing section, and to provide further mass transfer between the two phases. The mass transfer volume then releases the two-phase flow to the separator. The mass transfer volume may optionally be a simple tubular body having a bore. In one aspect, the mass transfer volume defines a bore having a fixed mixing element such as a helical element therein.

A method of separating an initial gas stream in a gas processing facility is also provided. In one embodiment, the gas stream includes methane gas and water. The initial gas stream is preferably a gas stream from a hydrocarbon production operation. The method involves dehydrating the gas stream.

In one aspect, the method includes the step of providing at least a first co-current contactor and a final co-current contactor. Each of these co-current contactors is configured to receive a gas stream and a liquid desiccant. Further, each of these contactors is configured to release a dehydrated gas stream and a separate wet desiccant solution. The co-current contactors are in-line contactors designed as described above. Progressively dehydrated gas streams are released in a first processing direction, while progressively wetter desiccant solutions are released in a second opposite processing direction.

A separate method of separating an initial gas stream in a gas processing facility is also provided. Here, the gas stream includes a non-absorbing gas and an acid gas. The initial gas stream is preferably a gas stream from a hydrocarbon recovery operation or a flue gas stream from an industrial plant. In the case of a hydrocarbon recovery operation, the non-absorbing gas is typically a hydrocarbon gas; in the case of a flue gas from an industrial plant, the non-absorbing gas is typically nitrogen.

In one embodiment, the method includes the step of providing at least a first co-current contactor and a final co-current contactor. Each of these co-current contactors is configured to receive a gas stream and a liquid solvent. Further, each of these contactors is configured to release a sweetened gas stream and a separate gas-treating solution. The co-current contactors are in-line contactors designed as described above.

The method also includes arranging the first co-current contactor, any intermediate co-current contactors, and the final co-current contactor to deliver the respective sweetened gas streams as progressively sweetened gas streams in series, and further arranging the final co-current contactor, any intermediate co-current contactors, and the first co-current contactor to deliver the respective gas-treating solutions as progressively richer solvent streams in series. Thus, the progressively sweetened gas streams are released in a first processing direction, while the progressively richer gas treating solutions are released in a second opposite processing direction.

In addition, the method includes delivering a regenerated liquid solvent to the final co-current contactor. The regenerated liquid solvent is a lean solvent.

The method further includes operating the gas processing facility in order to remove at least one acid gas component from the initial gas stream and to deliver a final sweetened gas stream from the final co-current contactor. In one aspect, the first co-current contactor receives (i) the initial gas stream and (ii) a second liquid solvent, and releases (iii) a first partially-sweetened gas stream and (iv) a rich gas treating solution;

a second co-current contactor receives (i) the first partially-sweetened gas stream from the first co-current contactor and (ii) a subsequent (or third) liquid solvent stream, and releases (iii) a second partially-sweetened gas stream and (iv) a second partially-loaded gas-treating solution, and the final co-current contactor receives (i) a penultimate partially-sweetened gas stream and (ii) the regenerated liquid solvent, and releases (iii) the final sweetened gas stream and (iv) a final lightly-loaded gas-treating solution.

Where only these three contactors are used, the subsequent liquid solvent is the final lightly-loaded gas-treating solution from the final contactor, and the penultimate sweetened gas stream received by the final contactor is the second partially-sweetened gas stream from the second contactor.

The co-contactors may also be used in series for regeneration of a solvent stream. Thus, a method of regenerating a liquid solvent stream in a gas processing facility is provided herein. In one embodiment, the method includes providing at least a first co-current contactor, a second co-current contactor, and a final co-current contactor. The co-current contactors are in-line contactors designed as described above. Each of the co-current contactors is configured (i) to receive a liquid solvent stream and a stripping gas stream, and (ii) to release an acid gas stream and a separate gas treating solution.

The method also includes arranging the first co-current contactor, the second co-current contactor and the final co-current contactor to deliver the respective acid gas streams as progressively acidic gas streams in series, and further arranging the final co-current contactor, the second co-current contactor and the first co-current contactor to deliver the respective gas-treating solutions as progressively leaner liquid solvent streams in series. Thus, the progressively acidic gas streams are released in a first processing direction, while the progressively leaner gas treating solutions are released in a second opposite processing direction.

In addition, the method includes delivering a rich liquid solvent to the final co-current contactor (such as from the gas processing facility above that generates a rich solvent stream or rich gas treating solution), and operating the gas processing facility in order to remove at least one acid gas component from the rich liquid solvent stream. A regenerated gas treating solution is then delivered from the first co-current contactor.

It is understood that the methods above may be used to remove an acid gas component from other fluid streams. These may include, for example, a sour water stream, a flash-gas stream, or a Claus tail gas stream.

BRIEF DESCRIPTION OF THE DRAWINGS

So that the manner in which the present invention can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 7 is an enlarged schematic view of a portion of the co-current contactor of FIG. 5, but in an alternate embodiment. The mass transfer vessel is more clearly seen. Here, the mass transfer vessel includes inlet nozzles for introducing liquid solvent or other absorbent liquid.

DETAILED DESCRIPTION OF CERTAIN EMBODIMENTS

Definitions

Figure 1:
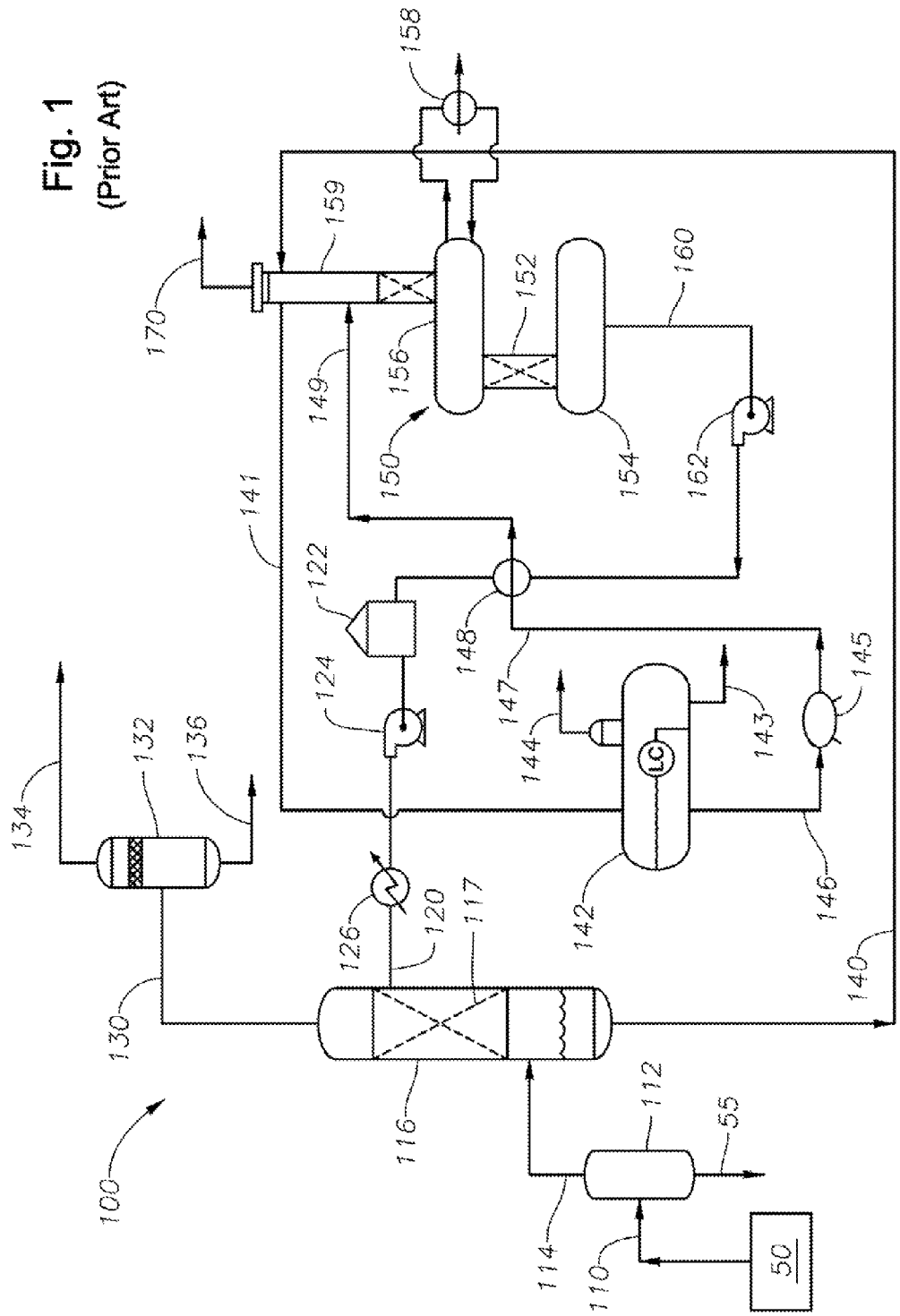
FIG. 1 is a schematic view of a known gas processing facility for the removal of an undesirable component from a raw gas stream. This process uses a large counter-current contacting tower. In the illustrative arrangement, the undesirable component is water.

As used herein, the term "co-current contacting device" or "co-current contactor" means a vessel that receives (i) a stream of gas (or other fluid stream to be treated) and (ii) a separate stream of liquid solvent (or other fluid treating solution)) in such a manner that the gas stream and the solvent stream contact one another while flowing in generally the same direction within the contacting device.

"Non-absorbing gas" means a gas that is not significantly absorbed by a solvent during a gas treating or conditioning process.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. The natural gas stream may also contain ethane ($C_2$), higher molecular weight hydrocarbons, one or more acid gases, and water. The natural gas may also contain minor amounts of contaminants such as nitrogen, iron sulfide, and wax.

As used herein, an "acid gas" means any gas that dissolves in water producing an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

"Flue gas" means any gas stream generated as a by-product of hydrocarbon combustion.

The term "industrial plant" refers to any plant that generates a gas stream containing at least one hydrocarbon or an acid gas. One non-limiting example is a coal-powered electrical generation plant. Another example is a cement plant that emits $CO_2$ at low pressures.

The term "liquid solvent" means a fluid in substantially liquid phase that preferentially absorbs one component over another. For example, a liquid solvent may preferentially absorb an acid gas, thereby removing or "scrubbing" at least a portion of the acid gas component from a gas stream or a water stream.

"Sweetened gas stream" refers to a fluid stream in a substantially gaseous phase that has had at least a portion of acid gas components removed. Further, the term "sweetened" may also refer to a fluid stream that has been taken through a dehydration or other conditioning process.

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring, hydrocarbons including cyclic terpenes. Examples of hydrocarbon-containing materials include any form of natural gas, oil, coal, and bitumen that can be used as a fuel or upgraded into a fuel.

As used herein, the terms "lean" and "rich," with respect to the absorbent liquid removal of a selected gas component from a gas stream, are relative, merely implying, respectively, a lesser or greater degree of content of the selected gas component The respective terms "lean" and "rich" do not necessarily indicate or require, respectively, either that an absorbent liquid is totally devoid of the selected gaseous component, or that it is incapable of absorbing more of the selected gas component. In fact, it is preferred, as will be evident hereinafter, that the so called "rich" absorbent liquid produced in a first contactor in a series of two or more contactors retains significant or substantial residual absorptive capacity. Conversely, a "lean" absorbent liquid will be understood to be capable of substantial absorption, but may retain a minor concentration of the gas component being removed.

With respect to fluid processing equipment, the term "in series" means that two or more devices are placed along a flow line such that a fluid stream undergoing fluid separation moves from one item of equipment to the next while maintaining flow in a substantially constant downstream direction. Similarly, the term "in line" means that two or more components of a fluid mixing and separating device are connected sequentially or, more preferably, are integrated into a single tubular device.

As used herein, the term "fluid" refers to gases, liquids, and combinations of gases and liquids, as well as to combinations of gases and solids, and combinations of liquids and solids.

DESCRIPTION OF SPECIFIC EMBODIMENTS

FIG. 1 demonstrates a known chemical solvent-based gas processing facility 100. The facility 100 operates to remove water from a raw natural gas stream. A raw natural gas stream is shown at stream 110, while a dehydrated gas stream is shown at stream 130. The raw natural gas stream 110 enters a contactor 116, while the dehydrated gas stream 130 exits the contactor 116. It is understood that acid gas components may be removed in connection with a subsequent process.

It will be appreciated that FIG. 1 is a simplified schematic diagram intended to make clear only selected aspects of the gas processing facility 100. A gas separation process will usually include many additional components such as heaters, chillers, condensers, liquid pumps, gas compressors, blowers, bypass lines, other types of separation and/or fractionation equipment, valves, switches, controllers, and pressure-, temperature-, level-, and flow-measuring devices.

In the illustrative arrangement of FIG. 1, the gas stream 110 is a raw natural gas from a hydrocarbon recovery operation. A subsurface reservoir is shown schematically at 50. The gas stream 110 contains at least one non-absorbing gas such as methane or other hydrocarbon gas. In addition, the gas stream 110 may contain at least one acid gas. An example of an acid gas is hydrogen sulfide. The sour natural gas stream 110 may have, for example, 1 to 10% $H_2S$ and/or 1 to 10% $CO_2$, along with at least one hydrocarbon gas.

Before entering the contactor 116, the raw natural gas stream 110 may pass through an inlet separator 112. The inlet separator 112 serves to filter out impurities such as brine and drilling fluids. Some particle filtration may also take place. It is understood that it is desirable to keep the gas stream 110 clean so as to prevent foaming of liquid solvent during a later acid gas treatment process.

When entering the separator 112, the gas stream 110 will be under pressure. This pressure is primarily due to the reservoir from which the gas product is produced. This pressure will carry the gas stream 110 through the separator 112 and into the contactor 116. The pressure of the gas stream 110 may vary considerably. Suitable pressures will range between atmospheric pressure and several thousand psig. However, for natural gas treating applications, it is particularly preferred that the gas stream 110 have a pressure of at least 100 psig, more typically at least 500 psig.

Some pressure drop will most likely take place in the inlet separator 112. Once inside the inlet separator 112, the gas stream 110 is separated into liquid-phase and gas-phase components. Liquid-phase components represent heavy hydrocarbons and a small portion of water. The liquid-phase components are released through line 55 and may be sent for oil recovery. At the same time, the gas-phase components are released as an overhead gas stream 114.

The contactor 116 uses a desiccant such as triethylene glycol to absorb water in the contactor 116. In FIG. 1, a lean glycol stream 120 is shown entering the contactor 116. The liquid glycol stream 120 originates at a glycol tank 122 proximate the contactor 116. Movement of the glycol stream 120 into the contactor 116 is aided by a fluid pump 124 that moves the glycol stream 120 into the contactor 116 under suitable pressure. The pump 124 may, for example, boost pressure of the glycol stream 120 to 1,000 psig or higher.

Once inside the contactor 116, gas from the gas stream 114 moves upward through the contactor 116. Typically, one or more trays or other internals (shown schematically at dashed lines 117) are provided within the contactor 116 to create indirect flow paths for the natural gas 114 and to create interfacial area between the gas and liquid phases. At the same time, the liquid from the lean solvent stream 120 moves downward and across the succession of trays 117 in the contactor 116. The trays 117 aid interaction of the natural gas 114 with the solvent stream 120.

The contactor 116 operates on the basis of a counter-current flow scheme. In this respect, natural gas is directed through the contactor 116 in one direction while liquid glycol is directed through the contactor 116 in the opposite direction. As the two fluid materials interact, the downflowing glycol absorbs water from the up-flowing natural gas to produce the dehydrated gas stream 130.

Upon exiting the contactor 116, the dehydrated gas stream 130 passes through an outlet separator 132. The outlet separator 132, also referred to as a scrubber, allows any liquid glycol carried over from contactor 116 to fall out of the gas phase. The outlet separator 132 may also be used as a water wash vessel to capture vapor-phase solvent. The contactor 116 operates at a high pressure, such as between 500 and 1,500 psia. A final dehydrated gas stream 134 is released from the outlet separator 132. Liquid glycol will drop out through line 136 and be directed to a sump (not shown).

A rich desiccant stream 140 drops out of the contactor 116. The desiccant stream 140 defines a glycol solution rich in the absorbed water. The desiccant stream 140 is warm, and may be at, for example, 90° to 110° F. The resultant desiccant stream 140 is moved directly into a regenerator 150.

The regenerator 150 is a large pressure vessel that operates at about 15 to 25 psig. The regenerator 150 first includes a distillation column 159. The distillation column 159 receives the rich desiccant stream 140 (as a warmed glycol stream 149) near a top of the column 159. Water vapor and off-gas are immediately released through an overhead stream 170. The water vapor and off-gas in stream 170 may be vented to the atmosphere, or may be directed to an incinerator. At the same time, the rich desiccant gravitationally falls through the distillation column 159 and enters a reboiler 156.

The reboiler 156 warms the rich desiccant. A heat source 158 is provided to the reboiler 156 to generate vapor traffic within the regenerator 150. The reboiler 156 typically uses steam as its heat source to boil off water and possibly some $H_2S$ and $CO_2$ from the glycol. Boiled components travel upward through the distillation column 159 and join the water vapor in overhead stream 170.

The regenerator 150 may also include a separate stripping section 152. The stripping section 152 defines a short series of internal trays or packings that promote further distillation. Additional water, $H_2S$ and $CO_2$ boil off and joins the water vapor in overhead stream 170. The ever-richer desiccant then enters a surge tank 154, where it is released as a lean glycol stream 160.

It is noted that the water vapor and off-gas released from the distillation column 159 contain heat. It is desirable to take advantage of this heat by using the heat to warm the rich desiccant stream 140. In FIG. 1, it can be seen that the rich desiccant stream 140 is passed through the column 159. This may be done by passing the rich desiccant stream 140 through a tube bundle in the top of the column 159. This serves to preheat the glycol (desiccant stream 140).

After being preheated, the desiccant stream 140 is released as a warmed glycol stream 141. The warmed glycol stream 141 is then introduced into a flash drum 142. The flash drum 142 operates at a pressure of about 50 to 100 psig. The flash drum 142 may have internal parts that create a mixing effect or a tortuous flow path for the warmed glycol stream 140 therein. Residual gases such as methane, $H_2S$ and $CO_2$ are flashed from the warmed glycol stream 141 at essentially atmospheric pressure through line 144. The residual gases captured in line 144 may be reduced to an acid gas content of about 100 ppm if contacted with a small amount of amine. This concentration is small enough that the residual gases can be used as fuel gas for the facility 100.

The glycol stream 141 will substantially cool as it flows into the flash drum 142. As the temperature and pressure drop, the desiccant condenses. A desiccant stream 146 is released from the flash drum 142. Optionally, the desiccant stream 146 is taken through a carbon filter or other filter 145 for particle filtration. A filtered desiccant stream 147 is then passed through a heat exchanger 148 for heat exchange with the lean desiccant stream 160.

The fluid in glycol stream 141 may carry some entrained heavier hydrocarbons, such as ethane or propane. It is desirable to capture these hydrocarbons. Accordingly, a liquid level controller (not shown) may be provided in the flash drum 142 for capturing heavy hydrocarbons. A hydrocarbon stream 143 is shown exiting the flash drum 142.

Returning again to the filtered glycol stream 147, passing the filtered glycol stream 147 through the heat exchanger 148 causes the glycol stream 147 to be warmed. In this respect, the lean desiccant stream 160 enters the heat exchanger 148 at a very high temperature, such as about 400° F. A warmed glycol stream 149 is released, and is taken back to the distillation column 159 of the regenerator 150. This reduces the energy requirements of the heat source 158.

The regenerator 150 produces a regenerated or "lean" glycol stream 160 that is recycled for re-use in the contactor 116. The lean glycol stream 160 exits the regenerator 150 and passes through the heat exchanger 148. The lean glycol stream 160 is again at a temperature of about 400° F. Thermal contact with the filtered water stream 147 in the heat exchanger 148 serves to partially cool the lean glycol stream 160 while heating the filtered water stream 147.

As the lean glycol stream 160 exits the regenerator 150, the lean glycol stream 160 is at a low pressure—about 15 to 25 psig. It is therefore desirable to raise the pressure of the lean glycol stream 160. Accordingly, the lean glycol stream 160 is passed through a booster pump 162. Pressure may be increased in the glycol stream to create a glycol inlet line 166 at a pressure up to 1,500 to even 2,500 psig. From there, the lean glycol stream 160 passes through the heat exchanger 148 and then to a cooler 126. The cooler 126 ensures that the lean glycol stream 160 is not flashing before being returned to the contactor 116.

In the arrangement of FIG. 1, a glycol storage tank 122 is shown. This is a reserve for the glycol stream 160. In most cases, the glycol storage tank 122 is bypassed en route back to the tower 116, and the glycol in stream 160 is directed immediately to the pump 124. The storage tank 122 will feed the glycol stream 160 by appropriate valving to allow suitable recharge. In either instance, the cooler 126 will typically chill the lean glycol stream 160/120 down to 100° to 125° F.

FIG. 1 demonstrates the use of a known contactor 116 in the context of a gas dehydration process. However, the gas processing facility 100 is also substantially representative of a sour gas removal operation. In that instance, the solvent stream 120 will contain a chemical solvent such as a primary amine, a secondary amine or a tertiary amine. The solvent stream 120 may also be an ionic liquid or a blend of a physical solvent with amine. An example of the latter is Sulfinol™. For purposes of discussion, the solvent stream 120 may be interchangeably referred to herein as amine, a chemical solvent, or an absorbent liquid.

It is understood that a solvent may preferentially remove hydrogen sulfide molecules over carbon dioxide molecules. A tertiary amine typically will not effectively strip out $CO_2$ as quickly as $H_2S$. Therefore, two separate processing facilities 100 may be sequentially operated, with one being arranged to strip out primarily hydrogen sulfide, and the other being designed to strip out primarily carbon dioxide. It may also be advantageous to generate a separate $CO_2$ stream that is substantially free of $H_2S$.

Regardless of the application and the solvent used, the disadvantage of counter-current flow schemes such as that shown in the facility 100 of FIG. 1, and in particular in the contactor 116, is that comparatively low velocities are required to avoid entrainment of the downflowing liquid solvent in the gas 110. Also, relatively long distances are required for disengagement of the liquid droplets from the gas 110. Depending on the flow rate of the sour gas stream 110, the contactor 116 can be greater than 15 feet in diameter, and more than 100 feet tall. For high-pressure applications, the vessel has thick, metal walls. Consequently, counter-current contactor vessels can be large and very heavy. This is expensive and undesirable, particularly for offshore oil and gas recovery applications.

In the process 100 of FIG. 1, a single contacting tower 116 is shown. However, it is sometimes known to utilize more than one contacting tower 116 to extract impurities through the rich solvent stream 140. In this instance, the problem of cost and weight related to the very large and heavy contactors is exacerbated. In this respect, very large contactors are required for high-volume, high pressure applications. In the case of low-pressure applications such as $CO_2$ removal from flue gas at a power generating plant, it is estimated that a 50 foot by 50 foot duct contactor would be required even for a relatively small, 500 megawatt power plant flue gas application. Many hundreds of gallons per minute of solvent would also be required to flow through the contactor 116.

The internals of the tower 116 also makes it susceptible to wave motion in an offshore environment. Therefore, it is desirable to have a mass transfer process that does not rely on conventional tower internals. It is further desirable to utilize a series of low pressure-drop, small contacting devices to remove $CO_2$ from $H_2S$ from flash-gas streams.

It is proposed herein to utilize a co-current flow scheme as an alternative to the counter-current flow scheme demonstrated in the one or more contacting towers 116. The co-current flow concept utilizes two or more contactors in series wherein a sour gas stream and a liquid solvent move together within the contactors. In one embodiment, the sour gas stream and the liquid solvent move together generally along the longitudinal axis of the respective contactors. Co-current flow contactors can operate at much higher fluid velocities. As a result, co-current flow contactors tend to be smaller than counter-current flow contactors (such as contactor 116) that utilize standard packed or trayed towers.

Figure 2A:
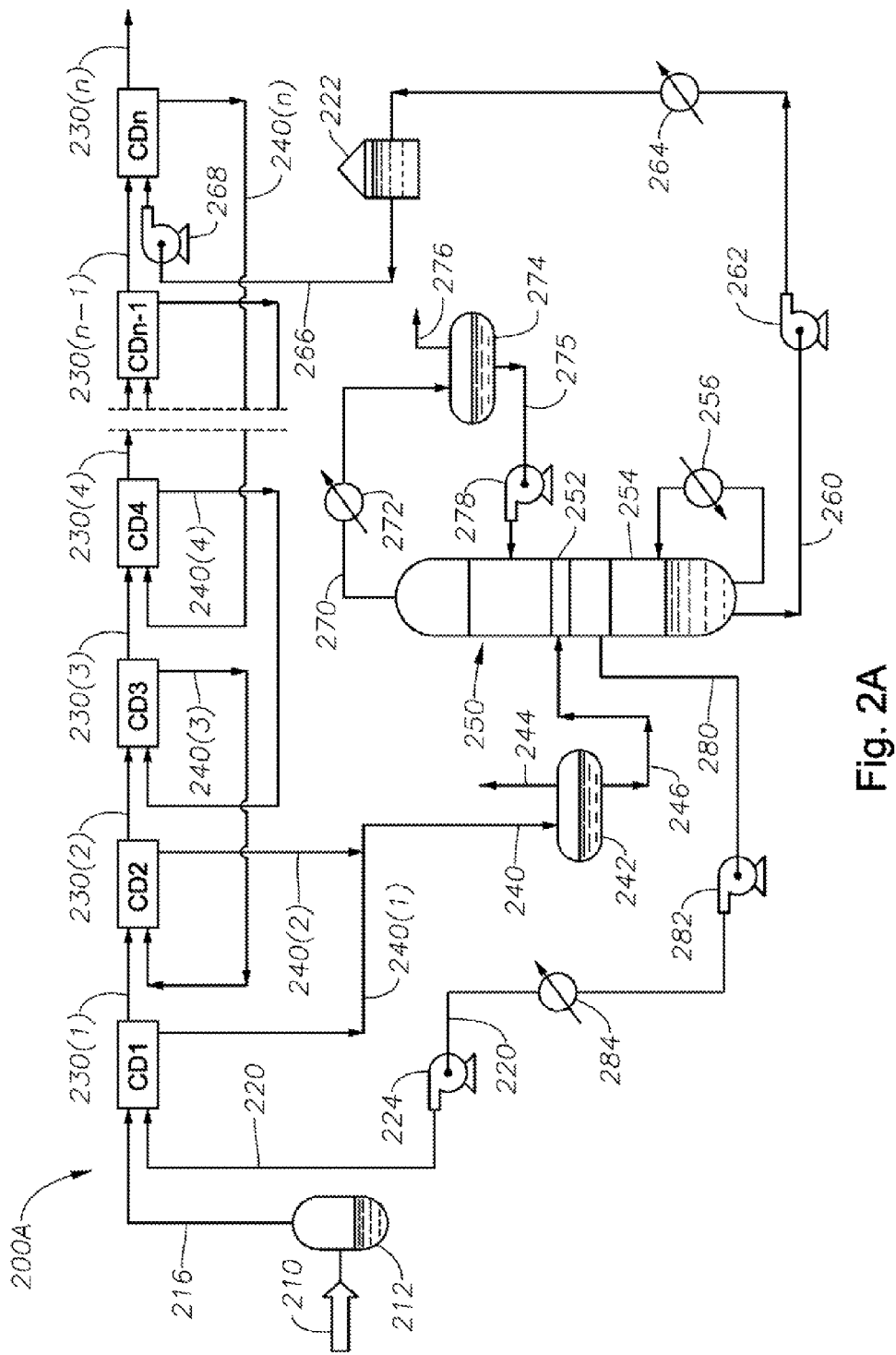
FIG. 2A is a schematic view of a gas processing facility for the removal of acid gas from a gas stream in accordance with the present invention, in one embodiment. The gas stream may be a gas stream incident to a hydrocarbon production operation, some other gas stream containing a hydrocarbon gas, or a flue gas stream from an industrial plant.
Figure 2B:
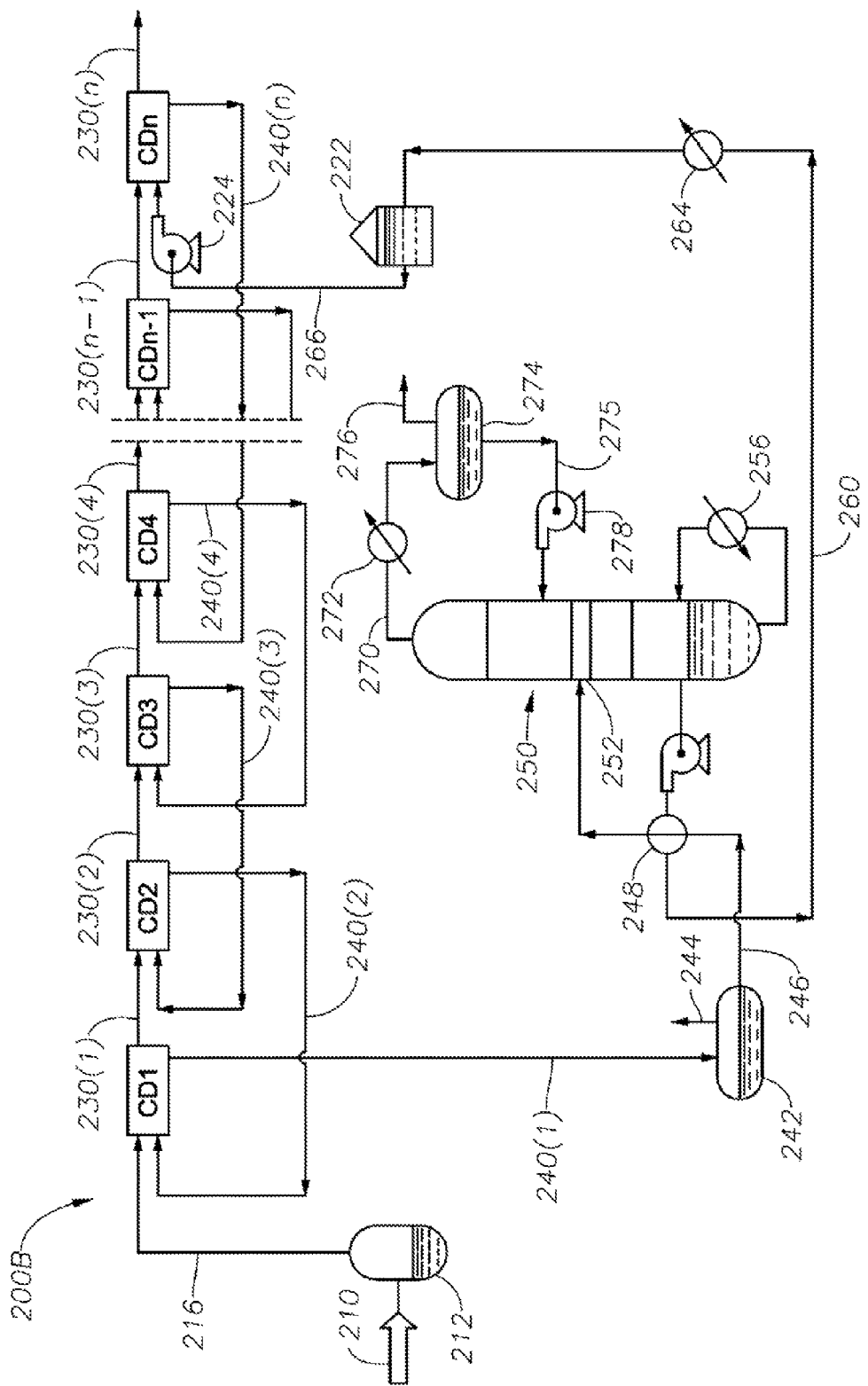
FIG. 2B is a schematic view of a gas processing facility for the removal of acid gas from a gas stream, in an alternate embodiment. The gas stream may again be a gas stream incident to a hydrocarbon production operation, a flue gas stream from an industrial plant, or other gas stream.

Two separate arrangements for gas processing facilities are shown in FIGS. 2A and 2B. Each figure presents a schematic view of a gas processing facility 200A, 200B, for the removal of $H_2S$ or other acid gases from a gas stream 210. Each facility 200A, 200B employs co-current flow contactors. The gas processing facilities 200A, 200B present alternatives for a sweetening facility to the facility 100 shown in FIG. 1.

In each of FIGS. 2A and 2B, the gas stream 210 may be a gas stream incident to a hydrocarbon production operation. Alternatively, the gas stream 210 may be a flue gas stream from a power plant, or a synthesis gas stream (so-called "syn-gas"). Alternatively, the gas stream may be a flash gas stream taken from a flash drum in a gas processing facility itself. It is noted that where syn-gas is used, the gas will need to be cooled and undergo solids filtration before introduction into the facility 200A or 200B. Alternatively, the gas stream 210 may be a tail gas stream from a Claus sulfur recovery process or an impurities stream from a regenerator. Alternatively still, the gas stream 210 may be a $CO_2$ emission from a cement plant or other industrial plant. In this instance, $CO_2$ may be absorbed from excess air or from a nitrogen-containing flue gas. For purposes of simplicity, the gas stream 210 will be referred to as a natural gas stream.

The natural gas stream 210 contains at least one non-absorbing gas such as a hydrocarbon gas. The gas stream 210 also contains an impurity. In the representative examples of FIGS. 2A and 2B, the impurity is an acid gas. The acid gas may be, for example, carbon dioxide or hydrogen sulfide. The gas processing facilities 200A, 200B operate to convert the gas stream 210 into sweet gas (shown at final stream 230(n)) by removal of the acid gas content.

In operation, the initial gas stream 210 enters a first co-current separator, or contacting device CD1 where it is mixed with a liquid solvent. The solvent preferably consists of an amine solution such as monoethanol amine (MEA), diethanol amine (DEA), or methyldiethanol amine (MDEA). However, other solvents such as physical solvents, alkaline salts solutions, or ionic liquids may be used. The solvent 220 is a lean solvent, having been taken through a desorption process to remove acid gas impurities.

In the illustrative facility 200A, the solvent introduced into the first contacting device CD1 is a semi-lean solvent 220 that is taken from a central portion of a regenerating tower 250. A truly lean solvent 260 taken from the tower 250 is directed into a final contactor CDn. In the facility 200B, the solvent introduced into the first contacting device CD1 is a second partially-loaded solvent 240(2) that is taken from a second contacting device CD2.

In accordance with the present disclosure and as discussed further below, each of the gas processing facilities 200A, 200B employs a series of co-current contactors CD1, CD2, . . . , CD(n−1), CDn. Each contactor removes a portion of the acid gas content from the gas stream 210, thereby releasing a progressively sweetened gas stream in a downstream direction. The final contactor CDn provides a final sweetened gas stream 230(n).

Before entering the first contactor CD1, the gas stream 210 optionally passes through an inlet separator 212. The inlet separator 212 serves to filter out impurities such as brine and drilling fluids. Some particle filtration may also take place. It is understood that it is desirable to keep the gas stream 210 clean so as to prevent foaming of solvent during the acid gas treatment process.

It is noted here that some pretreatment of the gas stream 210 may be desirable before entering the first contactor CD1 or even the inlet separator 212. For example, the gas stream 210 may undergo a water wash to remove glycol or other chemical additives. This may be done through a separate processing loop (not shown) wherein water is introduced to the gas, such as via a co-current contactor. Water has an affinity for glycol and will pull the glycol out of the natural gas. This, in turn, will help control foaming within the contacting devices CD1, CD2, . . . CDn. In the case of flue gas applications, corrosion inhibitors may need to be added to the solvent to retard the reaction of $O_2$ with the steel in the processes.

Referring specifically to FIG. 2A, and as noted above, a liquid solvent stream 220 also enters the first contactor CD1. The solvent stream 220 is a partially regenerated or "semi-lean" solvent produced by a regenerator 250. Movement of the semi-lean solvent stream 220 into the first contactor CD1 is aided by a pump 224. The pump 224 moves the semi-lean solvent stream 220 into the first contactor CD1 under suitable pressure. An example of a suitable pressure is about 15 psia to 1,500 psig.

Once inside the first contactor CD1, the gas stream 210 and the chemical solvent stream 220 move along the longitudinal axis of the first contactor CD1. As they travel, the liquid amine (or other treating solution) interacts with the $H_2S$ (or other selected acid gas such as $CO_2$) in the gas stream 210, causing the $H_2S$ to chemically attach to or be absorbed by amine molecules. A first partially-loaded or "rich" gas treating solution 240(1) drops out of a bottom of the first contactor CD1. At the same time, a first partially-sweetened gas stream 230(1) moves out of a top portion of the first contactor CD1 and enters a second contactor CD2.

The second contactor CD2 also represents a co-current, separating device. Optionally, a third co-current separating device CD3 is provided after the second contactor CD2, and a fourth co-current separating device CD4 is provided after the third contactor CD3. Each of the second, third, and fourth contactors CD2, CD3, CD4 generates a respective partially-sweetened gas stream 230(2), 230(3), 230(4). In addition, each of the fourth, third, and second contactors CD4, CD3, CD2 generates a respective partially-loaded gas treating solution 240(4), 240(3), 240(2). Where an amine is used as the solvent, the partially-loaded gas treating solutions 240(2), 240(3), 240(4) will comprise rich amine solutions. In the illustrative facility 200A, the second loaded gas treating solution 240(2) merges with the rich gas treating solution 240(1) and goes through a regeneration process, including going through the regenerator 250.

It is noted that as the sour natural gas 216 moves through the progressively-sweetened gas streams 230(1), 230(2), . . . 230(n−1) in a downstream direction, pressure in the system will generally decrease. As this happens, the pressure in the progressively-richer amine (or other liquid solvent) streams 240(n), 240(n−1), . . . 240(2), 240(1) in the upstream direction needs to generally increase to match the gas pressure. It is thus preferred in facility 200A that one or more small booster pumps (not shown) be placed between each of the contactors CD1, CD2, . . . . This will serve to boost liquid pressure in the system.

In the facility 200A, the regeneration process is similar to the process from the facility 100 of FIG. 1. In this respect, the streams 240(1), 240(2) comprise "rich" solvent solutions that are moved together through a flash drum 242. Absorbed natural gas is flashed from the solvent stream 240 through line 244. The resulting rich solvent stream 246 is directed into a regenerator 250.

In the facility 200B, the first partially-loaded or "rich" solvent solution 240(1) is also taken through the flash drum 242, but is then taken through a heat exchanger 248. Heat exchange takes place with the lean solvent 260 taken from the tower 250. This serves to heat the rich solvent before introduction into a regenerator 250, while beneficially cooling the lean solvent 260.

In either instance, a rich solvent stream 246 exits the flash drum 242. The rich solvent stream 246 is introduced into the regenerator 250 for desorption. The regenerator 250 defines a stripper portion 252 comprising trays or other internals (not shown) above a reboiler 254. A heat source 256 is provided with the reboiler 254 to generate heat. The regenerator 250 produces the regenerated or "lean" solvent stream 260 that is recycled for re-use in the final contactor CDn. Stripped overhead gas from the regenerator 250 containing concentrated $H_2S$ (or $CO_2$ if selected) exits the regenerator 250 as an impurities stream 270.

The $H_2S$-rich impurities stream 270 is preferably moved into a condenser 272. The condenser 272 serves to cool the impurities stream 270. The cooled impurities stream 270 is moved through a reflux accumulator 274 that separates any remaining liquid (mostly condensed water) from the impurities stream 270. A substantially pure acid gas stream 276 is then created.

Where the initial gas stream 210 comprises $CO_2$ and where a $CO_2$-selective solvent is used, the acid gas stream 276 will comprise primarily carbon dioxide. The $CO_2$-rich acid gas stream 276 may be used as part of a miscible oil recovery operation to recover oil. If the oil reservoir to be flooded is "sweet" (i.e., does not contain significant $H_2S$ or other sulfurous compounds), the $CO_2$ to be used for enhanced oil recovery ("EOR") should likewise be substantially "sweet." However, concentrated $CO_2$ streams from oil and gas production operations may be contaminated with small amounts of $H_2S$. Thus, it is desirable to remove the $H_2S$ from the $CO_2$ unless the acid gas is injected purely for geologic sequestration.

Where the initial gas stream 210 comprises $H_2S$, an $H_2S$-selective solvent may be used to capture hydrogen sulfide. The $H_2S$ may then be converted into elemental sulfur using a sulfur recovery unit (not shown). The sulfur recovery unit may be a so-called Claus process. Those of ordinary skill in the art will understand that a "Claus process" is a process that is sometimes used by the natural gas and refinery industries to recover elemental sulfur from hydrogen sulfide-containing gas streams.

In practice, the "tail gas" from the Claus process, which contains $H_2S$, $SO_2$, $CO_2$, $N_2$ and water vapor, can be reacted to convert the $SO_2$ to $H_2S$ via hydrogenation. The hydrogenated tail gas has a high partial pressure and significant amount (perhaps more than 50%) of $CO_2$, and a few percent or less of $H_2S$. This type of stream, which is typically near atmospheric pressure, is amenable to selective $H_2S$ removal. This is used to recover large fractions of the $H_2S$. The recovered $H_2S$ may be recycled to the front of the Claus unit or sequestered downhole. Alternatively, a direct oxidation of the $H_2S$ to elemental sulfur may be performed using various processes known in the field of gas separation.

Because the $H_2S$ reaction is instantaneous relative to the $CO_2$ reactions, lowering the residence time (contact time between the vapor and liquid phases) will result in less $CO_2$ being absorbed into the solvent. The design of the co-contactors 500 enhances selective $H_2S$ removal due to the short contact time inherent in the equipment design.

It is noted that an $H_2S$ removal process using co-current contactors may be either low pressure or high pressure. For gas streams with high $CO_2$, $H_2S$ can be removed under high pressure and fast contact times using an $H_2S$-selective amine that lets the $CO_2$ substantially slip.

As indicated in the facilities 200A, 200B of FIGS. 2A and 2B, some liquid may be dropped from the reflux accumulator 274. This results in a residual liquid stream 275. The residual liquid stream 275 is preferably carried through a pump 278 to boost pressure where it is then reintroduced into the regenerator 250. The residual liquid will exit the regenerator 250 at the bottom as part of the lean solvent stream 260. Some water content may optionally be added to the lean solvent stream 260 to balance the loss of water vapor to the sweetened gas streams 230($n$−1), 230($n$). This water may be added at an intake or suction of the reflux pump 278.

The lean or regenerated solvent stream 260 is at a low pressure. Accordingly, the regenerated solvent stream 260 is carried through a pressure boosting pump 262. Pump 262 is referred to as a lean solvent booster 262. From there, the lean solvent stream 260 optionally passes through a cooler 264. Cooling the solvent via cooler 264 ensures that the lean solvent stream 260 will absorb acid gases effectively and not become entrained with the gas. A chilled lean solvent stream 266 is then used as the solvent stream for the last separating contactor CDn.

A solvent tank 222 is optionally provided proximate the first contactor CD1. The chilled lean solvent stream 266 may pass through the solvent tank 222. More preferably, the solvent tank 222 is off-line and provides a reservoir for solvent as it may be needed for the gas facility 200A.

As noted, the facilities 200A and 200B each employ a plurality of co-current contactors CD1, CD2, . . . CD(n−1), CDn, in series. Each co-current contactor receives a gas stream that includes a hydrocarbon gas and an acid gas, or a flue gas containing $CO_2$. Each contactor CD1, CD2, . . . CD(n−1), CDn operates to produce a progressively-sweetened gas stream.

The first contactor CD1 receives the raw gas stream 210. The gas stream 210 is treated in the first contactor CD1 for the removal of acid gas. A first partially-sweetened gas stream 230(1) is then released. The first partially-sweetened gas stream 230(1) is delivered to the second contactor CD2. There, the first sweetened gas stream 230(1) is further treated for the removal of acid gas so that a second, more-fully sweetened gas stream 230(2) is released. This pattern is continued such that a third contactor CD3 produces a more fully-sweetened gas stream 230(3); a fourth contactor CD4 produces still an even more-sweetened gas stream 230(4). A next-to-last contactor CD(n−1) produces yet a more sweetened gas stream 230($n$−1). Each of these streams may be referred to as a "subsequent" sweetened gas stream.

A final sweetened gas stream 230($n$) is released by the final contactor CDn. The final sweetened gas stream 230($n$) is a commercial product that has been processed to within a desired standard. The final sweetened gas stream 230($n$) may be delivered or sold for residential or commercial use. The number of contacting devices (at least two) prior to the final contactor CDn is dictated primarily by the level of $CO_2$ (or other acid gas) removal needed to meet the desired standard.

In addition to receiving a gas stream, each co-current contactor CD1, CD2, . . . CD(n−1), CDn also receives a liquid solvent stream. In the facilities arrangement 200A of FIG. 2A, the first contactor CD1 receives a partially-regenerated or "semi-lean" solvent stream 220. Thereafter, subsequent contactors CD2, CD3, CD(n−1), CDn receive loaded solvent solutions released from the succeeding respective contactor. Thus, the second contactor CD2 receives partially-loaded solvent solution 240(3) released from the third contactor CD3; the third contactor CD3 receives a partially-loaded solvent solution 240(4) released from the fourth contactor CD4; and the next-to-last contactor CD(n−1) receives a partially-loaded solvent solution 240($n$) from the final contactor CDn. Stated another way, the liquid solvent received into the second contactor CD2 comprises a partially-loaded gas treating solution 240(3) released from the third contactor CD3; the liquid solvent received into the third contactor CD3 comprises a partially-loaded gas treating solution 240(4) released from the fourth contactor CD4; and the liquid solvent received into a next-to-last contactor CD(n−1) comprises a partially-loaded gas treating solution 240($n$) from the final contactor CDn. Thus, the partially-loaded solvent solutions are introduced into the contactors CDn, CD(n−1), CD3, . . .

CD2, CD1 in a processing direction opposite that of the flow of the progressively sweetened gas streams 230(1), 230(2), 230(3), . . . 230(n−1).

Operation of the gas processing facility 200B of FIG. 2B is similar to that of the facility 200A of FIG. 2A. However, in facility 200B, the first contactor CD1 receives the liquid solvent from the second contactor CD2. This means that facility 200B does not include the optional semi-lean solvent stream 220. The liquid solvent from the second contactor CD2 is referenced as solvent line 240(2). Solvent line 240(2) represents a gas treating solution created from the treatment of sweetened gas stream 230(1) within the second contactor CD2.

Because the liquid solvent 240(2) received by the first contactor CD1 in FIG. 2B has already been processed through at least one if not multiple contactors, the liquid solvent 240(1) received by the first contactor CD1 may be very rich. For this reason, it may be desirable to provide some level of intermediate processing of the solvent solution. This is described below in connection with FIG. 4.

Alternatively, a "semi-lean" gas stream could be taken from other sweetening operations in the gas facility 200A or 200B and used, at least in part, as an amine solution for the first CD1 or second CD2 contactor. In this respect, there are situations in which a single type of solvent is used for more than one service in a gas treating facility. This is referred to as integrated gas treatment. For example, MDEA may be used both for high-pressure, $H_2S$-selective acid gas removal, as well as in a Claus Tail Gas Treating (TGT) process. The "rich" amine from the TGT process is not heavily loaded with $H_2S$ and $CO_2$, owing to the low pressure of the process. Thus, in one embodiment herein the "rich" stream from the TGT process is used as a "semi-lean" stream for first CD1 or second CD2 contactor. The "semi-lean" stream (not shown) is pumped to pressure and injected into the first CD1 or second CD2 contactor, possibly along with solvent from the succeeding respective contactor.

In both of gas processing facilities 200A, 200B, the last separating contactor CDn also receives a liquid solvent. The liquid solvent is the regenerated solvent stream 260 (or, optionally, the cooled lean solvent stream 266). Regenerated solvent stream 260 is highly lean. As noted, solvent stream 260 may be cooled into the chilled lean solvent stream 266.

As indicated, the co-current contactors CD1, CD2, . . . CD(n−1), CDn release a progressively sweetened gas stream 230(1), 230(2), . . . 230(n−1), 230(n) in a first processing direction. The contactors CDn, CD(n−1), . . . CD3, CD2, CD1 also release or deliver progressively richer solvent solutions 240(n), 240(n−1), . . . 240(2), 240(1) in a second opposite processing direction. In the facility 200B, the leanest liquid solvent is delivered from the regenerator 250 into the final contactor CDn as the lean solvent stream 260. The next cleanest liquid solvent is the final solvent solution 240(n); the next cleanest liquid solvent is solvent solution 240(n−1); and working back to the first solvent solution 240(1). As discussed above, solvent solution 240(1) is sent to the regenerator 250.

Those of ordinary skill in the art of gas processing will understand that the absorption of acid gases into amine (or other chemical solvent) is an exothermic process. The heat that is generated raises the temperature of the partially-loaded solvent solutions 240(2), 240(3), . . . 240(n). This, in turn, reduces the capacity of the solvent to absorb $H_2S$ and $CO_2$. To counter this effect, and in one embodiment of the facility 200A, the solvent solutions 240(2), 240(3), . . . 240(f) are cooled between stages.

Another option for countering the effect of heat release is to place one or more of the co-current contacting devices CD1, CD2 inside of a jacket or a shell. The shell may be, for example, a carbon steel shell. In one aspect, the first contacting device CD1 and the second contacting device CD2 are together placed in a shell before being sent to the regenerator 250. A cooling medium is then circulated within the shell.

Figure 3A:
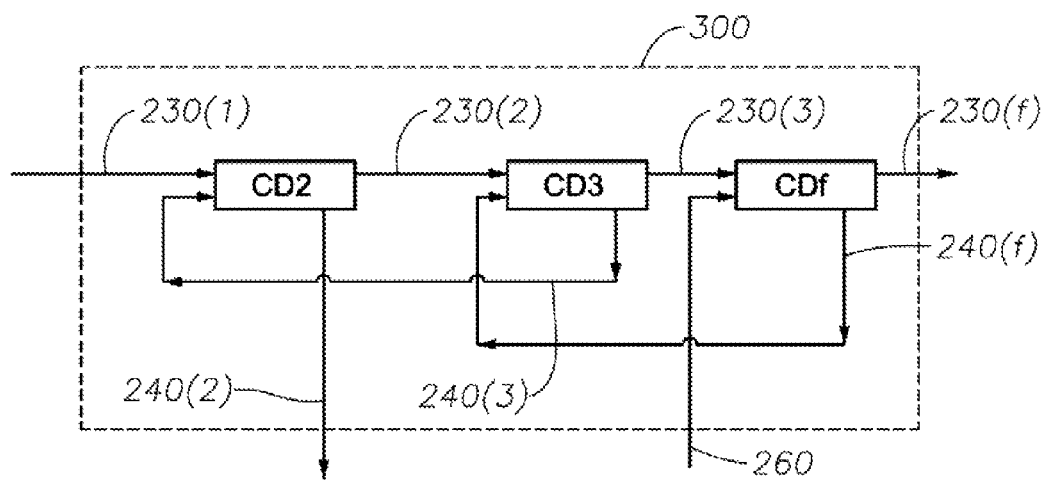
FIG. 3A is a schematic view of a portion of the gas processing facility of FIG. 2A, in one embodiment. Here, three co-current separating devices or "contactors" are placed within a shell.

FIG. 3A provides a schematic view of a shell 300. The shell 300 may be a permanent, climate-controlled structure. Alternatively, the shell 300 may be a temporary or portable structure. Alternatively still, the shell 300 may be an insulated jacket. In any instance, the shell 300 is part of the gas processing facility such as facility 200B that utilizes a plurality of co-current contacting devices in series. In the illustrative arrangement of FIG. 3A, a second contacting device CD2, a third contacting device CD3 and a final contacting device CDf are provided, each residing within the single shell 300.

The shell 300 is designed to keep the equipment and the solvent solutions flowing therein cool. This may be done through climate control within the shell 300 or through the circulation of a cooling medium adjacent to the equipment.

In the view of FIG. 3A, gas streams 230(2) and 230(3) are seen carrying sweetened gas away from the respective second CD2 and third CD3 contacting devices. In addition, the final contacting device CDf generates a final sweetened gas stream 230(f). The contacting devices CD2, CD3 and CDf also generate respective rich gas treating solutions 240(2), 240(3) and 240(f). The third gas treating solution 240(3) is directed back to the second contacting device CD2 as a liquid solvent while the final gas treating solution 240(f) is directed back to the third contacting device CD3.

It is noted in FIG. 3A that the second gas treating solution 240(2) is shown extending out of the shell 300. In practice, second gas treating solution 240(2) may be returned to a regenerator such as regenerator 250 shown in FIG. 2A, or may serve as a liquid solvent for a preceding contacting device such as first contacting device CD1 of FIG. 2B.

Figure 3B:
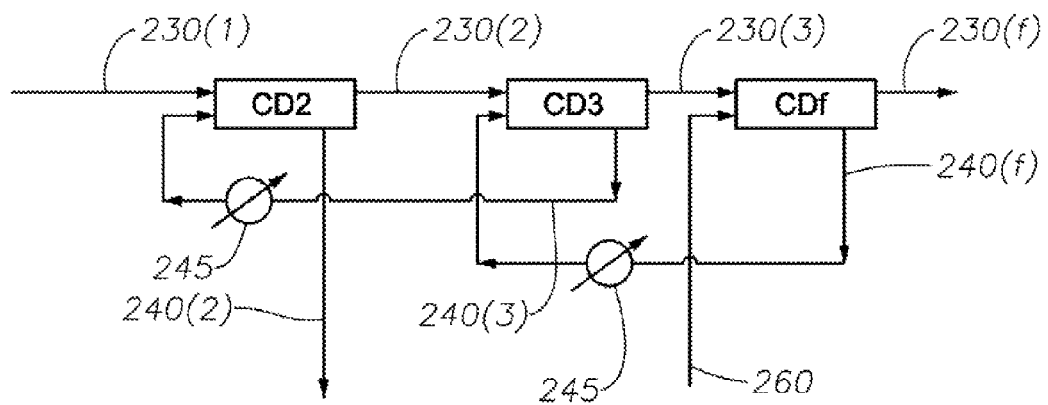
FIG. 3B is schematic view of a portion of the gas processing facility of FIG. 2A, in another embodiment. Here, dedicated coolers are used for cooling selected solvent solutions to a cooler temperature.

FIG. 3B provides another schematic view of a portion of the gas processing facility 200A of FIG. 2A. Here, dedicated coolers 245 are used for cooling the gas treating (or solvent) solutions 240(3) and 240(f). The use of heat-exchanging coolers 245 would typically be in lieu of one or more shells.

Figure 4:
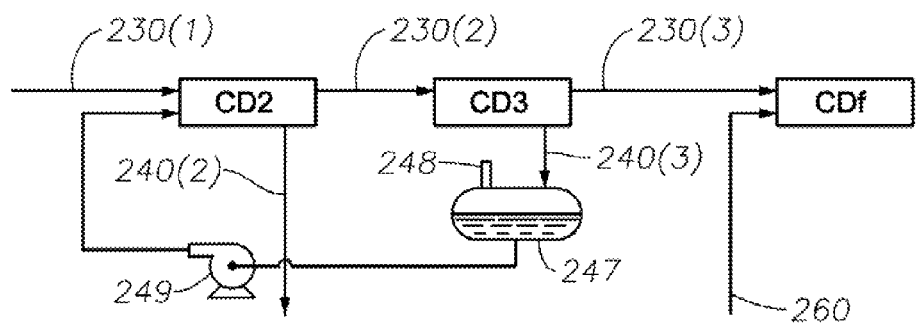
FIG. 4 is a schematic view of a portion of the gas processing facility of FIG. 2A, in another embodiment. Here, a flash drum and pressure boosting pump are placed along the third partially-loaded solvent stream.

Another feature that may be provided in the facility 200A is to provide a flash drum in one or all of the solvent solution lines 240(1), 240(2), 240(3), 240(4), . . . 240(n). FIG. 4 is a schematic view of a portion of the gas processing facility 200A of FIG. 2A, in another embodiment. Here, a flash drum 247 is placed along the third gas treating solution stream 240(3). A flash line 248 is provided coming off of the top of the flash drum 247. The flash drum 247 and associated flash line 248 permit methane and some $CO_2$ absorbed in the solvent within the solvent solution line 240(3) to be flashed out before the solvent solution returns to the next contactor. In FIG. 4, the next contactor is the second contactor CD2. $H_2O$ in vapor form may also vent from the flash line 248. Flashing creates a "semi-lean" solvent solution. This not only improves efficiency in the respective contactors CD2, CD3, . . . CDn, but also reduces the load on the thermal regenerator 250.

In the arrangement where a flash drum 247 is used, gas flashing out of the flash line 248 (comprising, for example, $CH_4$, $CO_2$ and $H_2O$) would preferably be merged with gas 244 from flash tank 242. The pressure would preferably match the pressure of $CH_4/CO_2$ coming off of the flash tank 242. Pressure of the impurities line 270 from regenerator 250 is typically at around 15 psig, and it contains primarily acid gases with very little $CH_4$. As such, this stream can be further compressed and injected downhole, or it can be processed to generate sulfur from $H_2S$.

Another feature that may be employed in the facility 200 is to provide a pressure boost along one or all of the solvent solution return lines 240(3), 240(4), ... 240(n). In the illustrative arrangement of FIG. 4, a pump 249 is shown in line 240(3) following the flash drum 247. Compression of the gas treating solution such as in line 240(3) overcomes pressure drop in the system along the compact contacting devices CD1, CD2, ... CDn. This, in turn, helps the solvent solution entrain the acid gases.

The use of multiple co-current separators in series has been described herein in connection with the removal of acid gases from a gas stream. FIGS. 2A and 2B show applications where $H_2S$ (or other acid gas) is removed down to sequentially lower concentrations through a plurality of contacting devices CD1, CD2, ... CDn. However, the facilities 200A, 200B, and particularly the use of a plurality of co-current contactors in series, may be used for other applications.

In one such application, the co-current contactors may be used in the upstream petroleum industry for the dehydration of natural gas, such as stream 210. Raw natural gas is often saturated with water. The water generally should be removed to avoid the formation of natural gas hydrates and to prevent corrosion in pipelines.

In known operations, dehydration is commonly accomplished by contacting the wet gas stream with a glycol solvent. The glycol solvent is typically triethylene glycol (TEG). Contacting takes place in a trayed tower or a packed absorber. In operation, lean TEG (substantially free of water) enters the top of the contactor, while the wet gas enters near the bottom of the tower. The two fluid streams flow counter-currently through the column. The downward-flowing TEG absorbs water from the upward flowing natural gas. The natural gas exits the top of the column substantially dry, while the rich TEG exits the bottom of the column, containing the absorbed water.

One or more co-current contactors (such as CD1 and CD2) may be used in place of the trayed tower or a packed absorber (shown at 116 in FIG. 1) for rapidly contacting a desiccant with wet gas. It is contemplated that no more than two compact absorbers would be needed to treat a natural gas stream to the necessary dew point specification. Further, higher pressure drops can be used to disperse the liquid solvent in the vapor phase and improve contacting efficiency.

Figure 5:
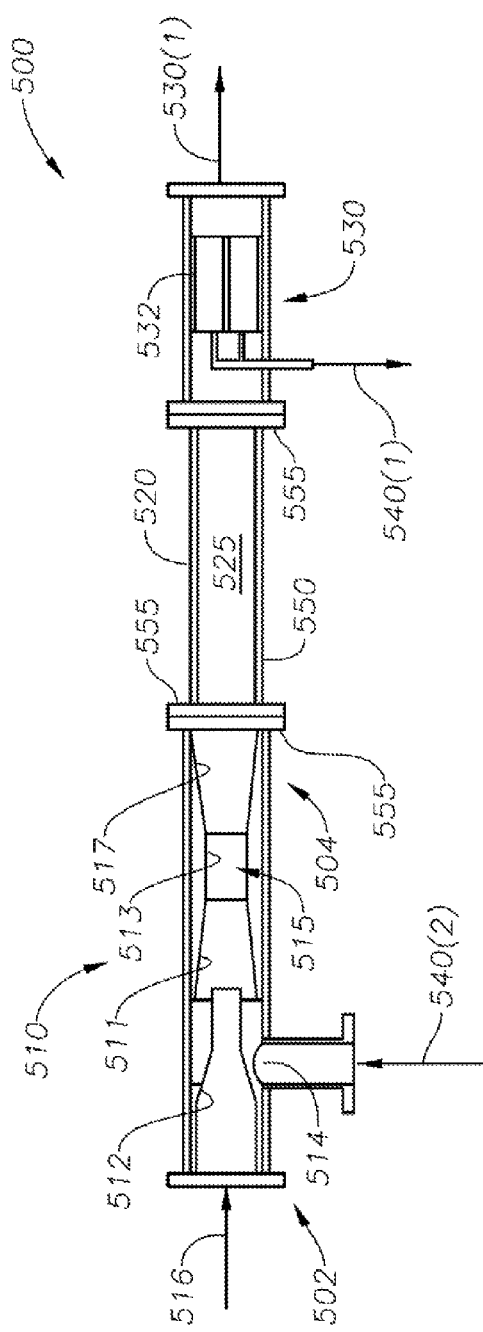
FIG. 5 is a schematic view of a co-current contactor as may be used in the gas processing facilities of FIGS. 2A and 2B, in one embodiment. In this embodiment, the contactor is designed to fit in-line with a flow line.

In order to implement the gas processing facilities 200A, 200B of FIGS. 2A and 2B, or other processing facilities where the rapid separation of fluid components is desired, a novel co-current contactor is offered herein. FIG. 5 provides a side view of a co-current contactor 500 of the present invention, in one embodiment.

The contactor 500 is designed to receive two fluid streams. These are (i) a gas stream to be treated, and (ii) a separate treating liquid. In FIG. 5, the fluid stream to be treated is shown at arrow 516. This is representative of, for example, the initial hydrocarbon gas streams 216 of FIGS. 2A and 2B. The treating liquid is shown at arrow 540(2). This is representative of, for example, the partially-loaded gas treating solution 240(2) of FIG. 2B. Thus, contactor 500 is representative of contacting device CD1.

The contactor 500 is also designed to release fluid components in two phases. These are (i) a gas-phase fluid stream, and (ii) a liquid-phase fluid stream. In FIG. 5, the gas-phase fluid stream is shown at arrow 530(1). This is representative of, for example, the first partially-sweetened gas stream 230(1) of FIGS. 2A and 2B. The liquid-phase fluid stream is shown at arrow 540(1). This is representative of, for example, the first partially-loaded or "rich" gas treating solution 240(1) of FIG. 2B. Thus, contactor 500 is again representative of contacting device CD1.

It is understood that contactor 500 may be representative of any other contacting device from FIG. 2A or 2B as used to remove an acid gas from a hydrocarbon fluid stream. Further, and as noted above, the contactor 500 may be employed for the removal of water from a natural gas stream wherein water falls out as the liquid phase.

As shown in FIG. 5, the contactor 500 first includes a mass transfer vessel 510. The mass transfer vessel 510 defines an elongated tubular body having a first end 502 and a second opposite end 504. The mass transfer vessel 510 includes a first inlet 512, which receives the fluid stream 516 to be treated. The first inlet 512 is proximate the first end 502 of the vessel 510. The mass transfer vessel 510 also includes a second inlet 514, which receives the treating liquid 540(2). The second inlet 514 is also proximate the first end 502 of the vessel 510.

The contactor 500 next includes a mixing section 515. The mixing section 515 resides within the mass transfer vessel 510, and is configured to receive the gas stream 516 and the liquid contacting stream 540(2). The mixing section 515 provides a mixed, two-phase flow from the gas stream 516 and the liquid contacting stream 540(2). The two-phase flow can be either liquid droplets dispersed in a vapor-continuous phase, or vapor bubbles dispersed in a liquid-continuous phase.

It is preferred that the mixing section 515 constitute an eductor. Generally, an eductor is a device wherein two separate fluid streams are introduced into a single vessel or tubular body at different angles. Most commonly, a first fluid is introduced along a longitudinal axis of the tubular body, while the other fluid is introduced perpendicular to the flow direction of the first fluid. Energy from the first fluid (liquid or gas) is transferred to the second fluid via the Venturi effect. The eductor delivers gas through a Venturi-like tube that in turn pulls liquid solvent into the mass transfer vessel 510. Because of the Venturi effect, the liquid solvent is dragged in and broken into small droplets, allowing a large surface area of contact with the gas.

In the arrangement of FIG. 5, the mixing section 515, or eductor, has a mixing chamber 511 that receives the gas stream 516 and the liquid contacting stream 540(2), a throat 513 defining an elongated reduced-diameter portion, and a diffuser 517 defining an expanded diameter portion. The diffuser 517 releases the mixed, two-phase flow proximate the second end 504.

Figure 6:
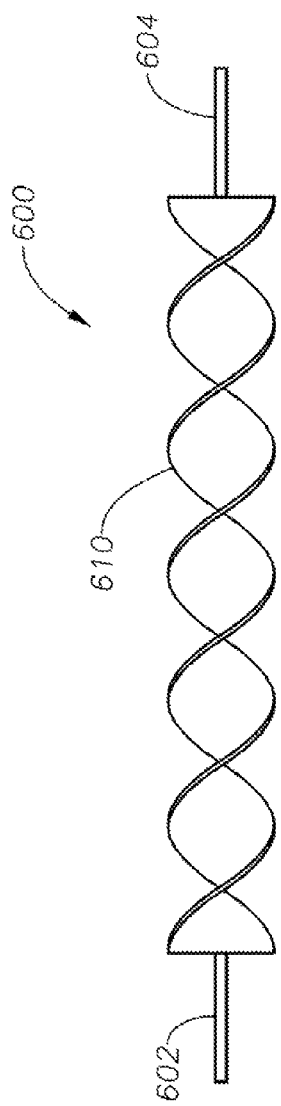
FIG. 6 is a perspective view of a fixed helical element as may be used for fluid mixing in the contactor of FIG. 5.

As an alternative, or in addition, the mixing section 515 may comprise a static mixer. In this instance, the mixing section 515 will have at least one mixing element. The mixing element may be, for example, a helical element. FIG. 6 provides a perspective view of an illustrative helical mixing element 600. The helical element 600 defines an elongated substantially solid body that creates a tortuous flow path for fluids along its surface. The helical element 600 has opposing rods 602, 604. These provide attachment means for fixing the helical element within the mixing section 515.

It is understood that other arrangements for a mixing element may be employed. For example, the mixing element may be a series of trays or packings having through-openings (not shown). In addition, the mixing section may include one or more spray nozzles for delivering a substantial portion of the liquid contacting stream 540(2) to the mixing section.

FIG. 7 provides an enlarged schematic view of the mass transfer vessel 510 from FIG. 5, in an alternate embodiment. The mass transfer vessel 510 is more clearly seen. Here, the mass transfer vessel 510 includes a small inlet 514 for receiving a liquid solvent. In addition, the vessel 510 includes a plurality of inlet nozzles 514' for introducing liquid solvent or other absorbent liquid in an atomized form.

It is preferred that each contacting device CD1, CD2, . . . CDn includes "atomization" nozzles such as inlet nozzles 514' which divide the liquid solvent into a large number of small droplets. This increases the surface area available for contact between the gas streams 216, 230(1), 230(2), . . . 230(n−1) and the co-flowing liquid solvent. Atomization also decreases the distances required for diffusion of acid gas components in both the vapor and liquid phases.

As yet another alternative for a contactor, the contactor 500 may employ only nozzles 514' as the inlet 514. In any arrangement, the mixing section 515 is optimized to minimize pressure drop while maintaining gas/liquid mixing.

The contactor 500 also includes a separator 530. The separator 530 resides proximate the second end 504 of the mass transfer vessel 510, and is configured to receive the two-phase flow. The separator 530 operates to separate a vapor phase from a liquid phase in the mixed, two-phase flow. Of interest, the separator 520 is "in-line" with the mass transfer vessel 510, meaning that the contactor 500 is an integrated device that allows the two-phase flow to proceed from the mass transfer vessel 510 into the separator 520 along a longitudinal axis of the contactor 500.

In the arrangement of FIG. 5, the separator 530 is configured to provide cyclonic phase separation. For example, and as shown in FIG. 5, the separator comprises one or more demisting cyclones 532. Alternatively, an integrated hydrocyclone may be employed.

The separator 530 may optionally include two sets of demisting cyclones 532 in-line within the contactor 500. Additionally, a mesh pad may be placed between two sets of demisting cyclones 532 to act as a coalescer. This creates larger droplets that can be more easily removed by the second set of cyclones 532.

In any event, the separator 530 includes a gas outlet configured to release the vapor phase as a treated gas stream. In FIG. 5, the gas outlet is shown at arrow 530(1). This is representative of, for example, the first partially-sweetened gas stream 230(1) of FIGS. 2A and 2B. The rich liquid is shown at arrow 540(2). This is representative of, for example, the rich treating solution 240(1) of FIG. 2B.

The liquid solvent from the separator 530 may discharge to a liquid surge boot (not shown) connected to the separator 532 or to a separate seal pot. The boot or seal pot provides residence time for process control and seals the separator 530 to prevent gas bypass.

The contactor 500 may also optionally include a mass transfer volume 520. The mass transfer volume 520 resides intermediate the mass transfer vessel 510 and the separator 530. The mass transfer volume 520 is configured to receive the mixed, two-phase flow from the mixing section 515 and to provide residence time for further mass transfer to occur between the two phases. The mass transfer volume 520 then releases the two-phase flow to the separator 530 in-line.

In the arrangement of FIG. 5, the mass transfer volume 520 comprises a tubular body having a substantially empty bore 525. Alternatively, the mass transfer volume 520 may have a fixed mixing element, such as element 600 from FIG. 6.

It is preferred that the contactor 500 be designed such that the separator 530 separates fluid components without substantially relying upon gravity separation. This allows fluids to flow rapidly through the mixing section 515, the mass transfer volume 520, and the separator 530. The co-current flow device 500 can operate at much higher fluid velocities than conventional counter-current towers since a separation stage is not limited by gravity phase separation. This generally allows a much smaller contactor than the corresponding counter-current towers.

It is also preferred that the contactor 500 components comprise elongated tubular bodies that are configured to be connected in-line with a flow line. Contactors 500 may be installed in-line, that is, in a pipeline configuration, resulting in considerable cost savings through elimination of large pressure vessel-code towers.

It can be seen from FIG. 5 that the principal components 510, 520, 530 of the contactor 500 have an outer tubular wall 550. The tubular wall 550 extends generally along the length of the contactor 500. The diameter of the tubular wall 550 for each of the components 510, 520, 530 can be increased or decreased as necessary to provide optimum separation efficiency. For example, the mass transfer volume 520 may have a smaller relative diameter to promote turbulent flow. Alternatively, the diameter of the tubular wall 550 along the separator 530 may be increased to accommodate a desired number of demisting cyclones for efficient phase separation.

In the arrangement of FIG. 5, the components 510, 520, 530 are discreet components, each having flanges 555 at their respective ends. The flanges 555 may be bolted together with appropriate sealing gaskets. Flanged construction facilitates maintenance while allowing for an integral fluid processing device 500. Alternatively, the components 510, 520, 530 may be threadedly connected or even welded end-to-end to form a single cylindrical wall. Such an arrangement is shown with respect to the mass transfer vessel 510 and the mass transfer volume 520 in FIG. 7. In FIG. 7, a flowline 505 is shown threadedly connected to the mass transfer vessel 510.

The tubular wall 550 defines an outer diameter for the contactor 500. In one aspect, the outer diameter is uniform along the length of the contactor 500, and is also substantially similar to an outer diameter of the flow line 505. In this instance, the mass transfer vessel 510, the optional mass transfer volume 520, and the separator 530 defines a single cylindrical wall 550 forming an outer diameter of the co-current contactor 500, and houses the mixing section 515, the mass transfer volume 520, and the separator 530. The use of standard pipe as a housing for the contactor 500 avoids the need for expensive pressure vessel code equipment. Additionally, the contactor 500 can be implemented in a pipeline 505 as opposed to a separate vessel.

In whatever embodiment, the compact vessel technology allows for a reduction of the size and weight of the hardware in comparison to the large columned contactors 114. Beneficially, the gas streams 216, 230(1), 230(2), . . . 230(n−1) and the co-currently flowing liquid solvent streams flow through the contactors CD1, CD2, . . . CDn in the same direction. This allows a short time period for the treatment reactions to take place, perhaps even as short as 100 milliseconds or less. This can be advantageous for selective $H_2S$ removal (relative to $CO_2$), as certain amines react more quickly with $H_2S$ than with $CO_2$.

The CD1, CD2, . . . CDn may be used for applications in addition to the upstream removal of water or $H_2S$. One such application involves the selective removal of $H_2S$ from the impurities stream 270 at the end of the regeneration process. This may be referred to as acid gas enrichment, or "AGE." The AGE process is useful where a concentrated $CO_2$ stream from a gas processing operation is contaminated with a relatively small amount of $H_2S$. Thus, it is desirable to remove the $H_2S$ from the $CO_2$ through a series of contacting devices using selective amine solvent to perform the separation. Preferred amines include tertiary amines like methyl diethanol amine (MDEA) or a hindered amine such as Flexsorb®. Alternatively, the utilization of a reactive solvent like chelated iron solution may be beneficial.

In operation, multiple co-current separators are provided along impurities line 270 (seen in FIG. 2A) for the sequential removal of $H_2S$ after the liquid solvent has been separated. This generally involves selective $H_2S$ removal from a low-pressure, high-$CO_2$ content stream. This application generally operates at a much lower pressure, e.g., about 15 psig, than acid gas removal from the filtered gas stream 216, which preferably operates at about 800 to 1,000 psig.

The AGE process generates a first gas stream having an increased concentration of $H_2S$. This first stream comes from the regeneration of the AGE solvent, and is sent to a sulfur recovery unit. The AGE process generates a second gas stream comprised primarily of $CO_2$ and water vapor. In some instances, the second gas stream may also contain mercaptans picked up by the acid gas removal process but not picked up by the AGE solvent. In this instance, it may be desirable to absorb these sulfur-containing compounds using a physical solvent like Selexol®. This too could be accomplished through a series of co-current contacting devices. The recovered sulfur-containing compounds may then be sent to a sulfur recovery unit.

The use of multiple co-current separators in series may also be used in connection with solvent regeneration. Regeneration is the process whereby $H_2S$ and/or $CO_2$ are removed from a "rich" solvent by decreasing its pressure and/or increasing its temperature. This has typically been done in a frayed tower as is represented by regenerator 250 of FIG. 2A. However, regeneration is also disclosed herein through the use of the co-current contactors. In this operation, the rich amine solution 246 is taken through a series of contactors 500.

Figure 8:
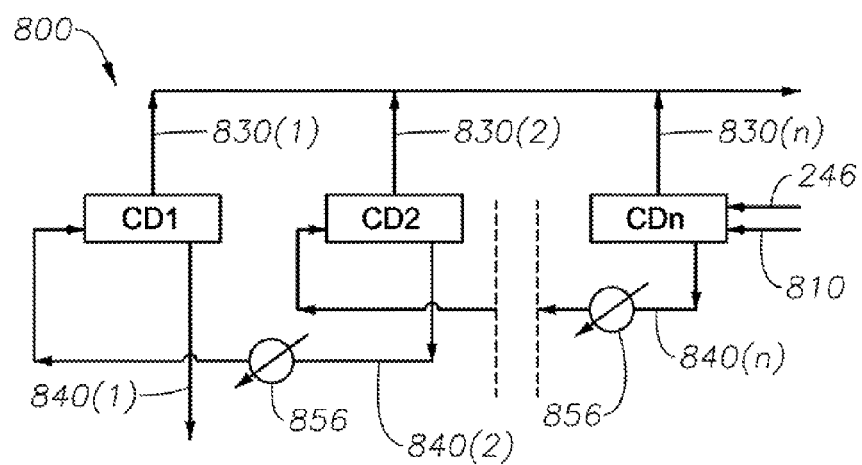
FIG. 8 is a schematic view of a gas regeneration facility. The facility uses a series of co-current contactors for the removal of acid gas from a rich solvent solution.

FIG. 8 is a schematic view of a gas regeneration facility 800. The facility 800 uses a series of co-current contactors CD1, CD2, ... CDn for the removal of acid gas from a rich solvent solution. In FIG. 8, the rich solvent solution is represented at 246. This matches with rich solvent solution 246 of FIG. 2A.

The rich solvent solution 246 is warm due to the exothermic chemical reaction involved in the earlier $CO_2$ or $H_2S$ removal process, and possible pre-heating with an outside source. The rich solvent solution 246 is introduced into an nth contacting device CDn. In the nth contacting device CDn, the rich solvent solution 246 is contacted with a stripping gas 810. The stripping gas 810 may be nitrogen, or air, as long as $H_2S$ is not present in the solvent. In this case, the stream may be vented to the atmosphere. Fuel gas (such as methane) may be used if only traces of $H_2S$ are present. The stripping gas could be gas generated by reboiling the liquid discharge from CD1. If $H_2S$ is present, the preferred stripping gas would be steam. In this case, the spent stream could be condensed, and the remaining vapor sent to a sulfur recovery unit, or an acid gas injection unit. Acid gas, e.g., $CO_2$ or $H_2S$ vapor, flashes off as acid gas stream 830($n$). At the same time, an nth solvent stream 840($n$) is generated.

The nth solvent stream 840($n$) is optionally heated using a heater 856. The nth solvent stream 840($n$) is then introduced into the next contactor in a series of co-current contactors. In the arrangement of FIG. 8, the next contactor is a second contacting device CD2. However, it is understood that any number of intermediate contacting devices may be provided in the regeneration facility 800, depending on the degree of acid gas removal desired.

At the second contacting device CD2, acid gas again flashes off, this time as acid gas stream 830(2). At the same time, a second partially-lean solvent stream 840(2) is generated. This second lean solvent stream 840(2) is preferably heated using a heater 856 and then introduced into a final contactor, indicated as first contacting device CD1. Acid gas flashes from first contacting device CD1 as acid gas stream 830(1). At the same time, a lean solvent solution 840(1) is ultimately regenerated. The lean solvent solution 840(1) may be introduced into contactor CDn of facility 200A or 200B as lean solvent stream 260.

It can be seen that the solvent regeneration process described in connection with FIG. 8 is essentially the reverse of the sweetening process described above in connection with FIGS. 2A and 2B.

As an additional application, multiple co-current contactors 500 may be used for the distillation of hydrocarbon mixtures or crude oil into near pure components. In this instance, the solvent is steam or heated kerosene, and the gas phase is methane and/or ethane. In this application, the hydrocarbon mixture is preferably heated to facilitate phase separation across the contactors.

Another application of the use of multiple co-contactors 500 involves flash gas conditioning. In high-pressure gas purification processes (e.g. acid gas removal, and dehydration), the rich solvent is often flashed into a vessel at a pressure in the range of 100 to 150 psig. This flash stage releases much of the physically absorbed methane, but also releases some of the absorbed contaminant (e.g. $H_2S$, $CO_2$, and water vapor). To meet fuel gas specifications, this stream is often re-contacted with a small slip-stream of lean solvent.

To remove impurities from the gas, such as in line 244, contacting devices may be employed as absorbers in series. Only two or three stages are anticipated as being necessary, as the $H_2S$ specification for flash gas is generally not as stringent as that for pipeline gas. In this respect, the flash gas is used as fuel gas within the gas processing facility 200A or 200B and is not commercially sold.

In yet another application, the gas stream may represent gas from a catalytic hydrodesulfurization process, or "CHDS." In oil refineries, CHDS is sometimes used to convert mercaptans, sulfides, thiophenes, and other sulfur-containing compounds to $H_2S$. As an incidental byproduct of the CHDS, light hydrocarbons may be produced. It is possible to treat this gas to remove the $H_2S$, then use the treated gas as fuel, for example. Such treatment may be through a series of co-current contactors as described above.

A number of methods have been demonstrated herein for sequentially removing acid gases from a raw gas stream by using two or more contactors in series. Embodiments of some methods herein involve the removal of acid gases, either partially or completely, and either selectively or non-selectively, from hydrocarbon gas streams. The gas stream may be a natural gas stream, a combustion exhaust gas stream, or a refining gas stream. The absorbent liquid preferably provides an absorption solution containing at least one chemical compound selected from the group comprising monoethanolamine (MEA), diglycolamine (DGA), diethanolamine (DEA), methyldiethanolamine (MDEA), 2-amino-2-methyl-1-propanol (AMP), piperazine (PZ), ammonia, amines, alkanolamines, their derivatives and other chemical solvents and/or mixtures thereof. The absorbent liquid may further comprise at least one chemical component selected from the group comprising kinetic enhancers, corrosion inhibitors, anti-foam chemicals, oxygen scavengers, salts, neutralizers, anti-fouling chemicals and anti-degradation chemicals.

The absorbent liquid may comprise at least one chemical component selected for absorbing, assimilating, or otherwise reacting with a gas selected from the group comprising $CO_2$, $H_2S$, $SO_2$, and $NO_R$. In another embodiment, the absorbent liquid comprises a desiccating liquid containing at least one chemical compound selected from the group comprising monoethylene glycol (MEG), diethylene glycol (DEG), or triethylene glycol (TEG). The gaseous component selected for removal in this case is water ($H_2O$).

An improved contactor is also offered herein. The contactor not only facilitates the rapid separation of impurities from a gas stream, but also allows the operator to easily change the number of contacting stages or contactors needed for contacting the gas. In this respect, the modular nature of the contactors CD1, CD2, . . . CDn within the facility 200A, 200B is attractive for applications where there may be large changes in conditions such as flow rate or composition of the initial gas stream 210 over the life of the operation.

Further embodiments are provided in the following Embodiments A-QQQ:

Embodiment A

A gas processing facility for the separation of components in a gas stream, the facility comprising at least one co-current contactor comprising:
 a mass transfer vessel having a first end and a second end;
 a first inlet configured to receive a gas stream proximate the first end of the mass transfer vessel;
 a second inlet configured to receive a liquid contacting stream also proximate the first end of the mass transfer vessel;
 a mixing section within the mass transfer vessel configured to receive the gas stream and the liquid contacting stream and to provide a mixed, two-phase flow;
 a separator proximate the second end of and in-line with the mass transfer vessel, configured to receive the two-phase fluid stream from the mass transfer vessel and then separate a vapor phase from a liquid phase;
 a gas-phase outlet in the separator configured to release the vapor phase as a treated gas stream; and
 a liquid-phase outlet in the separator configured to release the liquid phase as a loaded treating solution;
 wherein the separator is designed to separate fluid components without substantially relying upon gravity separation.

Embodiment B

The gas processing facility of Embodiment A, wherein the at least one co-current contactor comprises a first co-current contactor and a final co-current contactor.

Embodiment C

The gas processing facility of Embodiment B, wherein the first and final co-current contactors are in parallel.

Embodiment D

The gas processing facility of Embodiment B, wherein the first and final co-current contactors are in series.

Embodiment E

The gas processing facility of Embodiment D, wherein:
 the treated gas stream released through the gas outlet of the first co-current contactor is a first partially-treated gas stream;
 the loaded treating solution released through the liquid-phase outlet of the first co-current contactor is a rich treating solution;
 the gas stream received by the mixing section of the final co-current contactor is a previous partially-treated gas stream;
 the liquid contacting stream received by the mixing section of the final co-current contactor is a lean liquid solvent; and
 the treated gas stream released through the gas outlet of the final co-current contactor is a final treated gas stream.

Embodiment F

The gas processing facility of Embodiment E, wherein the liquid contacting stream received by the mass transfer vessel of the first co-current contactor is either a second liquid solvent stream received by a subsequent contactor, or a semi-lean liquid solvent received from a regenerator.

Embodiment G

The gas processing facility of Embodiment E or F, wherein the lean liquid solvent received by the final co-current contactor is a regenerated solvent.

Embodiment H

The gas processing facility of any of Embodiments E-G, wherein:
 the initial gas stream is a gas stream from a hydrocarbon production operation;
 the natural gas stream comprises methane and water;
 the second inlet of each contactor receives a desiccant as the liquid contacting stream;
 the rich treating solution comprises primarily separated water and the desiccant.

Embodiment I

The gas processing facility of Embodiment H, wherein the first co-current contactor and the final co-current contactor are the only contactors for separating the initial gas stream such that:
 the previous partially-treated gas stream received by the final co-current contactor comprises a first partially-treated gas stream released from the first co-current contactor; and
 the liquid solvent received by the first co-current contactor comprises a final lightly-loaded desiccant solution released by the final co-current contactor.

Embodiment J

The gas processing facility of Embodiment H or I, further comprising a second co-current contactor configured to receive (i) the first partially-treated gas stream from the first contactor, and (ii) a third liquid solvent, and is configured to release (iii) a second partially-treated gas stream and (iv) a second partially-loaded desiccant solution.

Embodiment K

The gas processing facility of Embodiment J, wherein the first, second, and final co-current contactors are the only contactors for separating the fluid stream such that:
 the previous partially-treated gas stream received by the final co-current contactor comprises the second partially-treated gas stream released from the second co-current contactor;

the third liquid solvent received by the second co-current contactor comprises a final lightly-loaded desiccant solution released by the final co-current contactor; and the liquid solvent received by the first co-current contactor comprises the second partially-loaded desiccant solution released by the second co-current contactor.

Embodiment L

The gas processing facility of Embodiment J, further comprising:

a third co-current contactor configured to receive (i) the second partially-treated gas stream from the second contactor and (ii) a fourth liquid solvent, and configured to release (iii) a third partially-treated gas stream and (iv) a third partially-loaded desiccant solution; and wherein:

the previous partially-treated gas stream received by the final co-current contactor comprises the third partially-treated gas stream released from the third co-current contactor; and the liquid solvent received by the second co-current contactor comprises the third partially-loaded desiccant solution released by the third co-current contactor.

Embodiment M

The gas processing facility of any of Embodiments A-L, wherein the initial gas stream is: a gas stream from a hydrocarbon recovery operation, a tail gas stream from a Claus sulfur recovery process, an acid gas stream from a solvent regeneration process requiring $H_2S$ enrichment, a synthesis-gas stream, a flue gas stream from an industrial plant, an acid gas stream from a cement plant, or a flash gas stream created internally within the gas processing facility.

Embodiment N

The gas processing facility of Embodiment M, wherein:

the gas stream is a natural gas stream from a hydrocarbon production operation;

the liquid contacting stream is a solvent for absorbing an acid gas component;

the first partially-treated gas stream is a first partially-sweetened gas stream; and the final treated gas stream is a final sweetened gas stream that comprises primarily methane.

Embodiment O

The gas processing facility of Embodiment N, wherein the first co-current contactor and the final co-current contactor are the only contactors for separating the initial gas stream such that:

the previous partially-treated gas stream received by the final co-current contactor comprises a first partially-sweetened gas stream released from the first co-current contactor; and the liquid solvent received by the first co-current contactor comprises a final lightly-loaded treating solution released by the final co-current contactor.

Embodiment P

The gas processing facility of Embodiment N, further comprising a second co-current contactor configured to receive (i) the first partially-sweetened gas stream from the first contactor, and (ii) a third liquid solvent, and is configured to release (iii) a second partially-sweetened gas stream and (iv) a second partially-loaded gas treating solution.

Embodiment Q

The gas processing facility of any of Embodiments A-P, wherein the gas processing facility further comprises an inlet separator that filters out impurities from the gas stream before delivering the initial gas stream to the first co-current contactor.

Embodiment R

The gas processing facility of any of Embodiments A-Q, wherein:

each of the mass transfer vessels comprises an elongated tubular body configured to be connected in-line with a flow line; and each of the separators also comprises an elongated tubular body configured to be connected in-line with the flow line.

Embodiment S

The gas processing facility of Embodiment R, wherein each of the mixing sections comprises an eductor having (i) a mixing chamber that receives the gas stream and the liquid contacting stream, and (iii) a diffuser having an expanded diameter that releases the mixed, two-phase flow.

Embodiment T

The gas processing facility of Embodiment S, further comprising (ii) a throat defining an elongated reduced-diameter portion between the mixing chamber and the diffuser.

Embodiment U

The gas processing facility of Embodiment S or T, wherein the each of the mixing sections comprises a static mixer having at least one mixing element along the major axis.

Embodiment V

The gas processing facility of any of Embodiments S-U, wherein the mixing element is a fixed helical element.

Embodiment W

The gas processing facility of any of Embodiments R-V, wherein each of the mass transfer vessels and each of the separators comprises an outer diameter that is substantially similar to an outer diameter of the flow line.

Embodiment X

The gas processing facility of any of Embodiments R-W, wherein each of the mass transfer vessels and each of the separators defines a single cylindrical wall forming an outer diameter of the respective co-current contactor, and that houses the respective mixing section and separator.

Embodiment Y

The gas processing facility of any of Embodiments A-X, wherein each of the co-current contactors further comprises an intermediate mass transfer volume configured to receive the mixed, two-phase flow from the respective mixing section and to provide further mass transfer between the two phases, and then release the two-phase flow to the respective separator.

Embodiment Z

The gas processing facility of Embodiment Y, wherein:
the mass transfer vessel and the separator of each co-current contactor each comprises an elongated tubular body configured to be connected in-line with a flow line; and
the intermediate mass transfer volume of each co-current contactor defines an elongated tubular body also configured to be connected in-line with the flow line.

Embodiment AA

The gas processing facility of any of Embodiments A-Z, wherein the second inlet of each co-current contactor comprises at least one spray nozzle for delivering a substantial portion of the liquid contacting stream to the respective mixing section.

Embodiment BB

The gas processing facility of any of Embodiments A-AA, wherein the separator of each co-current contactor is configured to provide cyclonic phase separation.

Embodiment CC

The gas processing facility of Embodiment BB, wherein the separator of each co-current contactor comprises one or more demisting cyclones.

Embodiment DD

The gas processing facility of Embodiment N, wherein the natural gas stream has been substantially dehydrated before entering the first co-current contactor.

Embodiment EE

The gas processing facility of Embodiment DD, wherein:
the natural gas stream comprises hydrogen sulfide as a sour gas component; and
the solvent comprises amine for selective $H_2S$ removal.

Embodiment FF

The gas processing facility of Embodiment EE, further comprising:
a liquid solvent regenerator configured to produce the lean liquid solvent.

Embodiment GG

A co-current contactor for the separation of components in a fluid stream, the contactor comprising:
a mass transfer vessel having a first end and a second end;
a first inlet configured to receive the fluid stream proximate the first end of the mass transfer vessel;
a second inlet configured to receive a liquid contacting stream also proximate the first end of the mass transfer vessel;
a mixing section within the mass transfer vessel configured to receive the fluid stream and the liquid contacting stream and to provide a mixed, two-phase flow;
a separator proximate the second end of and in-line with the mass transfer vessel, configured to receive the two-phase flow from the mass transfer vessel and then separate a vapor phase from a liquid phase;
a gas outlet at the at the separator configured to release the vapor phase as a treated gas stream; and
a liquid-phase outlet at the separator configured to release the liquid phase as a loaded treating solution;
wherein the separator is designed to separate fluid components without substantially relying upon gravity separation.

Embodiment HH

The co-current contactor of Embodiment GG, wherein:
the mass transfer vessel comprises an elongated tubular body configured to be connected in-line with a flow line; and
the separator also comprises an elongated tubular body configured to be connected in-line with the flow line.

Embodiment II

The co-current contactor of Embodiment GG or HH, wherein the mixing section comprises an eductor having (i) a mixing chamber that receives the gas stream and the liquid contacting stream, and (iii) a diffuser having an expanded diameter that releases the mixed, two-phase flow.

Embodiment II

The co-current contactor of Embodiment II, further comprising (ii) a throat defining an elongated reduced-diameter portion intermediate the mixing chamber and the diffuser.

Embodiment KK

The co-current contactor of any of Embodiments HH-JJ, wherein the mixing section comprises a static mixer having at least one mixing element.

Embodiment LL

The co-current contactor of any of Embodiments HH-KK, wherein the mass transfer vessel and the separator each comprises an outer diameter that is substantially similar to an outer diameter of the flow line.

Embodiment MM

The co-current contactor of any of Embodiments HH-KK, wherein the mass transfer vessel and the separator defines a single cylindrical wall forming an outer diameter of the co-current contactor, and that houses the mixing section and the separator.

Embodiment NN

The co-current contactor of any of Embodiments HH-MM, further comprising an intermediate mass transfer volume configured to receive the mixed, two-phase flow from the mixing section in-line and to provide further mass transfer between the two phases, and then release the two-phase flow to the separator.

Embodiment OO

The co-current contactor of Embodiment NN, wherein the mass transfer volume comprises a tubular body having a substantially empty bore.

Embodiment PP

The co-current contactor of Embodiment NN, wherein:
the mass transfer vessel and the separator each comprises an elongated tubular body configured to be connected in-line with a flow line; and
the intermediate mass transfer volume defines an elongated tubular body also configured to be connected in-line with the flow line.

Embodiment QQ

The co-current contactor of Embodiment PP, wherein the mass transfer vessel, the intermediate mass transfer volume, and the separator each comprises an outer diameter that is substantially similar to an outer diameter of the flow line.

Embodiment RR

The co-current contactor of any of Embodiments NN-QQ, wherein the mass transfer vessel, the mass transfer volume, and the separator defines a single cylindrical wall forming an outer diameter of the co-current contactor, and that houses the mixing section, the mass transfer volume, and the separator.

Embodiment SS

The co-current contactor of Embodiment PP, wherein:
the mixing section, the mass transfer volume, and the separator each comprises a separate cylindrical wall connected through flanges; and
the mixing section, the mass transfer volume, and the separator are connected end-to-end such that the separate cylindrical walls together form a housing for the co-current contactor.

Embodiment TT

The co-current contactor of any of Embodiments GG-SS, wherein the second inlet comprises at least one spray nozzle for delivering a substantial portion of the liquid contacting stream to the mixing section.

Embodiment UU

The co-current contactor of any of Embodiments GG-TT, wherein the separator is configured to provide cyclonic phase separation.

Embodiment VV

The co-current contactor of Embodiment UU, wherein the separator comprises one or more demisting cyclones.

Embodiment WW

The co-current contactor of any of Embodiments GG-VV, wherein the separator comprises two in-line cyclonic phase separators, in series.

Embodiment XX

The co-current contactor of any of Embodiments GG-WW, wherein the separator comprises a first cyclonic phase separator followed by a mesh pad separator, followed by a second cyclonic phase separator, in series.

Embodiment YY

A method of separating fluidic components in a natural gas stream in a gas processing facility, the initial gas stream comprising methane and water, and the method comprising:
providing at least a first co-current contactor and a final co-current contactor, each of these co-current contactors being configured (i) to receive a gas stream and a liquid desiccant, and (ii) to release a treated gas stream and a separate desiccant solution;
arranging the first co-current contactor and the final co-current contactor to deliver the respective treated gas streams as progressively dehydrated gas streams in series;
further arranging the final co-current contactor and the first co-current contactor to deliver the respective desiccant solutions as progressively wetter desiccant streams in series;
delivering a regenerated liquid desiccant to the final co-current contactor; and
operating the gas processing facility in order to remove water from the initial gas stream and to deliver a final dehydrated gas stream from the final co-current contactor; and
wherein each of the co-current contactors comprises any of Embodiments GG-XX.

Embodiment ZZ

The method of Embodiment YY, wherein:
the treated gas stream released through the gas-phase outlet of the first co-current contactor is a first partially-dehydrated gas stream;
the wet desiccant stream released through the liquid-phase outlet of the first co-current contactor is a rich gas treating solution comprising substantially methane and water;
the gas stream received by the mixing section of the final co-current contactor is a previous partially-dehydrated gas stream;
the liquid desiccant stream received by the mixing section of the final co-current contactor is a regenerated lean liquid desiccant stream;
the treated gas stream released through the gas-phase outlet of the final co-current contactor is a final dehydrated gas stream; and
the wet desiccant stream released through the liquid-phase outlet of the final co-current contactor is a final lightly-loaded gas treating solution.

Embodiment AAA

The method of Embodiment YY or ZZ, further comprising a second co-current contactor, wherein the second co-current contactor is configured to receive (i) the first partially-dehydrated gas stream from the first contactor and (ii) a third liquid desiccant stream, and is configured to release (iii) a second partially-dehydrated gas stream and (iv) a second partially-loaded gas treating solution.

Embodiment BBB

The method of Embodiment AAA, wherein the first, second and final co-current contactors are the only contactors for separating the natural gas stream such that:
the previous partially-dehydrated gas stream received by the final co-current contactor comprises the second partially-dehydrated gas stream released from the second co-current contactor; and the third liquid desiccant stream received by the second co-current contactor comprises the final lightly-loaded gas treating solution released by the final co-current contactor.

Embodiment CCC

The method of any of Embodiments YY-BBB, wherein an inlet pressure for the mass transfer vessel of the first contactor is about 500 to 1,000 psi.

Embodiment DDD

The method of any of Embodiments YY-CCC, wherein the desiccant is selected from the group comprising monoethylene glycol (MEG), diethylene glycol (DEG), and triethylene glycol (TEG).

Embodiment EEE

A method of separating fluidic components in an initial gas stream in a gas processing facility, the initial gas stream comprising a non-absorbing gas and an acid gas, and the method comprising:
providing at least a first co-current contactor, a second co-current contactor and a final co-current contactor, each of these co-current contactors being configured (i) to receive a gas stream and a liquid solvent, and (ii) to release a treated gas stream and a separate gas-treating solution;
arranging the first co-current contactor, the second co-current contactor and the final co-current contactor to deliver the respective sweetened gas streams as progressively sweetened gas streams in series;
further arranging the final co-current contactor, the second co-current contactor and the first co-current contactor to deliver the respective gas-treating solutions as progressively richer solvent streams in series;
delivering a regenerated liquid solvent to the final co-current contactor; and
operating the gas processing facility in order to remove at least one acid gas component from the initial gas stream and to deliver a final sweetened gas stream from the final co-current contactor; and
wherein each of the co-current contactors comprises any of Embodiments GG-XX.

Embodiment FFF

The method of Embodiment EEE, wherein the initial gas stream is:
a gas stream from a hydrocarbon recovery operation,
a tail gas stream from a Claus sulfur recovery process,
an acid gas stream from a solvent regeneration process requiring $H_2S$ enrichment,
a synthesis-gas stream,
a flue gas stream from an industrial plant,
an acid gas stream from a cement plant, or
a flash gas stream created internally within the gas processing facility.

Embodiment GGG

The method of Embodiment ZZ, wherein:
the initial gas stream received by the mixing section of the first co-current contactor is a natural gas stream;
the non-absorbing gas comprises methane;
the treated gas stream released through the gas-phase outlet of the first co-current contactor is a first partially-sweetened gas stream;
the solvent stream released through the liquid-phase outlet of the first co-current contactor is a rich gas treating solution;
the gas stream received by the mixing section of the final co-current contactor is a previous partially-sweetened gas stream;
the liquid solvent stream received by the mixing section of the final co-current contactor is a regenerated lean liquid solvent stream;
the treated gas stream released through the gas-phase outlet of the final co-current contactor is a final sweetened gas stream; and
the solvent stream released through the liquid-phase outlet of the final co-current contactor is a final lightly-loaded gas treating solution.

Embodiment HHH

The method of any of Embodiments YY-GGG, wherein the initial natural gas stream comprises $CO_2$, $H_2S$, mercaptans, $SO_x$, or combinations thereof.

Embodiment III

The method of Embodiment GGG, wherein the solvent stream received by the mass transfer vessel of the first co-current contactor is either a second liquid solvent stream received by a subsequent contactor, or a semi-lean liquid solvent received from a regenerator.

Embodiment JJJ

The method of Embodiment GGG, wherein the solvent comprises a physical solvent, a chemical solvent, or a hybrid solvent.

Embodiment KKK

The method of Embodiment JJJ, wherein:
the solvent comprises amine for selective $H_2S$ removal; and
the rich gas treating solution comprises primarily $H_2S$ and amine.

Embodiment LLL

A method of regenerating a liquid solvent stream in a gas processing facility, the liquid solvent stream comprising primarily an acid gas and a solvent, and the method comprising:
providing at least a first co-current contactor, a second co-current contactor and a final co-current contactor, each of these co-current contactors being configured (i) to receive a liquid solvent stream and a stripping gas stream, and (ii) to release an acid gas stream and a separate gas treating solution;
arranging the first co-current contactor, the second co-current contactor and the final co-current contactor to deliver the respective acid gas streams as progressively acidic gas streams in series;
further arranging the final co-current contactor, the second co-current contactor and the first co-current contactor to deliver the respective gas-treating solutions as progressively leaner liquid solvent streams in series;
delivering a rich liquid solvent to the final co-current contactor; and operating the gas processing facility in order to remove at least one acid gas component from the rich liquid solvent stream and to deliver a regenerated gas treating solution from the first co-current contactor; and wherein each of the co-current contactors comprises any of Embodiments GG-XX.

Embodiment MMM

The method of Embodiment LLL, wherein the stripping gas comprises methane.

Embodiment NNN

The method of Embodiment LLL or MMM, wherein:
the acid gas comprises primarily hydrogen sulfide; and
the regenerated gas treating solution comprises primarily amine.

Embodiment OOO

The method of Embodiment NNN, wherein the amine comprises a tertiary amine, or a hindered amine.

Embodiment PPP

The method of Embodiment LLL, wherein:
the gas stream received by the mixing section of the first co-current contactor is an initial stripping gas stream;
the liquid solvent stream received by the mixing section of the first co-current contactor is a second liquid solvent stream;
the acidic gas stream released through the gas-phase outlet of the first co-current contactor is a first partially-acidic gas stream;
the gas stream received by the mixing section of the final co-current contactor is a previous partially-acidic gas stream;
the liquid solvent stream received by the mixing section of the final co-current contactor is a loaded gas treating solution;
the acidic gas stream released through the gas-phase outlet of the final co-current contactor is a final acidic gas stream; and
the gas-treating solution released through the liquid-phase outlet of the final co-current contactor is a final lightly-loaded gas treating solution.

Embodiment QQQ

The method of Embodiment LLL, wherein the second co-current contactor is configured to receive (i) the first partially-acidic gas stream and (ii) a third liquid solvent stream, and is configured to release (iii) a second partially-acidic gas stream and (iv) a second partially-loaded gas treating solution.

While it will be apparent that the invention herein described is well calculated to achieve the benefits and advantages set forth above, it will be appreciated that the invention is susceptible to modification, variation and change without departing from the spirit thereof.

What is claimed is:

1. A co-current contactor for the separation of components in a fluid stream, the contactor comprising:
a mass transfer vessel having a first end and a second end;
a first inlet configured to receive the fluid stream proximate the first end of the mass transfer vessel;
a second inlet configured to receive a liquid contacting stream also proximate the first end of the mass transfer vessel;
a mixing section within the mass transfer vessel configured to receive the fluid stream and the liquid contacting stream and to provide a mixed, two-phase flow having a vapor phase and a liquid phase;
a separator proximate the second end of and in-line with the mass transfer vessel, configured to receive the two-phase flow from the mass transfer vessel and then separate the vapor phase from the liquid phase;
a gas outlet at the at the separator configured to release the vapor phase as a treated gas stream; and
a liquid-phase outlet at the separator configured to release the liquid phase as a loaded treating solution;
wherein the separator is designed to separate fluid components without substantially relying upon gravity separation; and
wherein the mass transfer vessel and the separator defines a single cylindrical wall forming an outer diameter of the co-current contactor, and that houses the mixing section and the separator.

2. The co-current contactor of claim 1, wherein:
the mass transfer vessel comprises an elongated tubular body configured to be connected in-line with a flow line; and
the separator also comprises an elongated tubular body configured to be connected in-line with the flow line.

3. The co-current contactor of claim 2, wherein the mixing section comprises an eductor having (i) a mixing chamber that receives the gas stream and the liquid contacting stream, and (iii) a diffuser having an expanded diameter that releases the mixed, two-phase flow.

4. The co-current contactor of claim 3, further comprising (ii) a throat defining an elongated reduced-diameter portion intermediate the mixing chamber and the diffuser.

5. A co-current contactor for the separation of components in a fluid stream, the contactor comprising:
a mass transfer vessel having a first end and a second end;
a first inlet configured to receive the fluid stream proximate the first end of the mass transfer vessel;
a second inlet configured to receive a liquid contacting stream also proximate the first end of the mass transfer vessel;
a mixing section within the mass transfer vessel configured to receive the fluid stream and the liquid contacting stream and to provide a mixed, two-phase flow having a vapor phase and a liquid phase;
a separator proximate the second end of and in-line with the mass transfer vessel, configured to receive the two-phase flow from the mass transfer vessel and then separate the vapor phase from the liquid phase;
a gas outlet at the at the separator configured to release the vapor phase as a treated gas stream; and
a liquid-phase outlet at the separator configured to release the liquid phase as a loaded treating solution;
wherein the separator is designed to separate fluid components without substantially relying upon gravity separation; and
an intermediate mass transfer volume configured to receive the mixed, two-phase flow from the mixing section in-line and to provide further mass transfer between the two phases, and then release the two-phase flow to the separator.

6. The co-current contactor of claim 5, wherein, the mass transfer volume comprises at least one mixing element.

7. The co-current contactor of claim 5, wherein the mass transfer volume comprises a tubular body having a substantially empty bore.

8. The co-current contactor of claim 5, wherein:
the mass transfer vessel and the separator each comprises an elongated tubular body configured to be connected in-line with a flow line; and
the intermediate mass transfer volume defines an elongated tubular body also configured to be connected in-line with the flow line.

9. The co-current contactor of claim 8, wherein the mass transfer vessel, the intermediate mass transfer volume, and the separator each comprises an outer diameter that is substantially similar to an outer diameter of the flow line.

10. The co-current contactor of claim 8, wherein the mass transfer vessel, the mass transfer volume, and the separator defines a single cylindrical wall forming an outer diameter of the co-current contactor, and that houses the mixing section, the mass transfer volume, and the separator.

11. The co-current contactor of claim 8, wherein:
the mixing section, the mass transfer volume, and the separator each comprises a separate cylindrical wall connected through flanges; and
the mixing section, the mass transfer volume, and the separator are connected end-to-end such that the separate cylindrical walls together form a housing for the co-current contactor.

12. The co-current contactor of claim 5, wherein:
the mass transfer vessel comprises an elongated tubular body configured to be connected in-line with a flow line; and
the separator also comprises an elongated tubular body configured to be connected in-line with the flow line.

13. The co-current contactor of claim 12, wherein the mixing section comprises an eductor having (i) a mixing chamber that receives the gas stream and the liquid contacting stream, and (iii) a diffuser having an expanded diameter that releases the mixed, two-phase flow.

14. The co-current contactor of claim 13, further comprising (ii) a throat defining an elongated reduced-diameter portion intermediate the mixing chamber and the diffuser.

15. A co-current contactor for the separation of components in a fluid stream, the contactor comprising:
a mass transfer vessel having a first end and a second end;
a first inlet configured to receive the fluid stream proximate the first end of the mass transfer vessel;
a second inlet configured to receive a liquid contacting stream also proximate the first end of the mass transfer vessel;
a mixing section within the mass transfer vessel configured to receive the fluid stream and the liquid contacting stream and to provide a mixed, two-phase flow having a vapor phase and a liquid phase;
a separator proximate the second end of and in-line with the mass transfer vessel, configured to receive the two-phase flow from the mass transfer vessel and then separate the vapor phase from the liquid phase;
a gas outlet at the at the separator configured to release the vapor phase as a treated gas stream; and
a liquid-phase outlet at the separator configured to release the liquid phase as a loaded treating solution;
wherein the separator is designed to separate fluid components without substantially relying upon gravity separation; and
wherein the separator comprises a first cyclonic phase separator followed by a mesh pad separator, followed by a second cyclonic phase separator, in series.

16. The co-current contactor of claim 15, wherein the separator comprises one or more demisting cyclones.

17. The co-current contactor of claim 15, wherein:
the mass transfer vessel comprises an elongated tubular body configured to be connected in-line with a flow line; and
the separator also comprises an elongated tubular body configured to be connected in-line with the flow line.

18. The co-current contactor of claim 17, wherein the mixing section comprises an eductor having (i) a mixing chamber that receives the gas stream and the liquid contacting stream, and (iii) a diffuser having an expanded diameter that releases the mixed, two-phase flow.

19. The co-current contactor of claim 18, further comprising (ii) a throat defining an elongated reduced-diameter portion intermediate the mixing chamber and the diffuser.

20. A facility comprising at least one co-current contactor, wherein the at least one co-current contactor comprises:
a mass transfer vessel having a first end and a second end;
a first inlet configured to receive the fluid stream proximate the first end of the mass transfer vessel;
a second inlet configured to receive a liquid contacting stream also proximate the first end of the mass transfer vessel;
a mixing section within the mass transfer vessel configured to receive the fluid stream and the liquid contacting stream and to provide a mixed, two-phase flow having a vapor phase and a liquid phase;
a separator proximate the second end of and in-line with the mass transfer vessel, configured to receive the two-phase flow from the mass transfer vessel and then separate the vapor phase from the liquid phase;
a gas outlet at the at the separator configured to release the vapor phase as a treated gas stream; and
a liquid-phase outlet at the separator configured to release the liquid phase as a loaded treating solution;
wherein the separator is designed to separate fluid components without substantially relying upon gravity separation, and
wherein the at least one co-current contactor comprises a first co-current contactor and a final co-current contactor.

21. The gas processing facility of claim 20, wherein the first and final co-current contactors are in parallel.

22. The gas processing facility of claim 20, wherein the first co-current contactor and the final co-current contactor are in series.

23. The gas processing facility of claim 22, wherein:
the treated gas stream released through the gas outlet of the first co-current contactor is a first partially-treated gas stream;
the loaded treating solution released through the liquid-phase outlet of the first co-current contactor is a rich treating solution;
the gas stream received by the mixing section of the final co-current contactor is a previous partially-treated gas stream;
the liquid contacting stream received by the mixing section of the final co-current contactor is a lean liquid solvent; and
the treated gas stream released through the gas outlet of the final co-current contactor is a final treated gas stream.

24. The gas processing facility of claim 23, wherein:
the initial gas stream is a gas stream from a hydrocarbon production operation;
the natural gas stream comprises methane and water;
the second inlet of each contactor receives a desiccant as the liquid contacting stream;
the rich treating solution comprises primarily separated water and the desiccant.

25. The gas processing facility of claim 23, wherein the initial gas stream is:
a gas stream from a hydrocarbon recovery operation,
a tail gas stream from a Claus sulfur recovery process,
an acid gas stream from a solvent regeneration process requiring $H_2S$ enrichment,
a synthesis-gas stream,
a flue gas stream from an industrial plant,
an acid gas stream from a cement plant, or
a flash gas stream created internally within the gas processing facility.

26. The gas processing facility of claim 25, wherein:
the gas stream is a natural gas stream from a hydrocarbon production operation;
the liquid contacting stream is a solvent for absorbing an acid gas component;
the first partially-treated gas stream is a first partially-sweetened gas stream; and
the final treated gas stream is a final sweetened gas stream that comprises primarily methane.

27. The gas processing facility of claim 23, wherein the gas processing facility further comprises an inlet separator that filters out impurities from the gas stream before delivering the initial gas stream to the first co-current contactor.

28. The gas processing facility of claim 23, wherein the natural gas stream has been substantially dehydrated before entering the first co-current contactor.

29. The gas processing facility of claim 28, wherein:
the natural gas stream comprises hydrogen sulfide as a sour gas component; and
the solvent comprises amine for selective $H_2S$ removal.

30. The gas processing facility of claim 29, further comprising:
a liquid solvent regenerator configured to produce the lean liquid solvent.

31. A method of separating fluidic components in a natural gas stream in a gas processing facility, the initial gas stream comprising methane and water, and the method comprising:
providing at least a first co-current contactor and a final co-current contactor, each of these co-current contactors being configured (i) to receive a gas stream and a liquid desiccant, and (ii) to release a treated gas stream and a separate desiccant solution;
arranging the first co-current contactor and the final co-current contactor to deliver the respective treated gas streams as progressively dehydrated gas streams in series;
further arranging the final co-current contactor and the first co-current contactor to deliver the respective desiccant solutions as progressively wetter desiccant streams in series;
delivering a regenerated liquid desiccant to the final co-current contactor; and
operating the gas processing facility in order to remove water from the initial gas stream and to deliver a final dehydrated gas stream from the final co-current contactor; and
wherein each of the co-current contactors comprises:
a mass transfer vessel having a first end and a second end;
a first inlet configured to receive the fluid stream proximate the first end of the mass transfer vessel;
a second inlet configured to receive a liquid contacting stream also proximate the first end of the mass transfer vessel;
a mixing section within the mass transfer vessel configured to receive the fluid stream and the liquid contacting stream and to provide a mixed, two-phase flow having a vapor phase and a liquid phase;
a separator proximate the second end of and in-line with the mass transfer vessel, configured to receive the two-phase flow from the mass transfer vessel and then separate the vapor phase from the liquid phase;
a gas outlet at the at the separator configured to release the vapor phase as a treated gas stream; and
a liquid-phase outlet at the separator configured to release the liquid phase as a loaded treating solution;
wherein the separator is designed to separate fluid components without substantially relying upon gravity separation.

32. A method of separating fluidic components in an initial gas stream in a gas processing facility, the initial gas stream comprising a non-absorbing gas and an acid gas, and the method comprising:
providing at least a first co-current contactor, a second co-current contactor and a final co-current contactor, each of these co-current contactors being configured (i) to receive a gas stream and a liquid solvent, and (ii) to release a treated gas stream and a separate gas-treating solution;
arranging the first co-current contactor, the second co-current contactor and the final co-current contactor to deliver the respective sweetened gas streams as progressively sweetened gas streams in series;
further arranging the final co-current contactor, the second co-current contactor and the first co-current contactor to deliver the respective gas-treating solutions as progressively richer solvent streams in series;
delivering a regenerated liquid solvent to the final co-current contactor; and
operating the gas processing facility in order to remove at least one acid gas component from the initial gas stream and to deliver a final sweetened gas stream from the final co-current contactor; and
wherein each of the co-current contactors comprises:
a mass transfer vessel having a first end and a second end;
a first inlet configured to receive the fluid stream proximate the first end of the mass transfer vessel;
a second inlet configured to receive a liquid contacting stream also proximate the first end of the mass transfer vessel;
a mixing section within the mass transfer vessel configured to receive the fluid stream and the liquid contacting stream and to provide a mixed, two-phase flow having a vapor phase and a liquid phase;
a separator proximate the second end of and in-line with the mass transfer vessel, configured to receive the two-phase flow from the mass transfer vessel and then separate the vapor phase from the liquid phase;
a gas outlet at the at the separator configured to release the vapor phase as a treated gas stream; and
a liquid-phase outlet at the separator configured to release the liquid phase as a loaded treating solution;
wherein the separator is designed to separate fluid components without substantially relying upon gravity separation.

33. A method of regenerating a liquid solvent stream in a gas processing facility, the liquid solvent stream comprising primarily an acid gas and a solvent, and the method comprising:
providing at least a first co-current contactor, a second co-current contactor and a final co-current contactor, each of these co-current contactors being configured (i)

to receive a liquid solvent stream and a stripping gas stream, and (ii) to release an acid gas stream and a separate gas treating solution;

arranging the first co-current contactor, the second co-current contactor and the final co-current contactor to deliver the respective acid gas streams as progressively acidic gas streams in series;

further arranging the final co-current contactor, the second co-current contactor and the first co-current contactor to deliver the respective gas-treating solutions as progressively leaner liquid solvent streams in series;

delivering a rich liquid solvent to the final co-current contactor; and operating the gas processing facility in order to remove at least one acid gas component from the rich liquid solvent stream and to deliver a regenerated gas treating solution from the first co-current contactor; and wherein each of the co-current contactors comprises:
  a mass transfer vessel having a first end and a second end;
  a first inlet configured to receive the fluid stream proximate the first end of the mass transfer vessel;
  a second inlet configured to receive a liquid contacting stream also proximate the first end of the mass transfer vessel;
  a mixing section within the mass transfer vessel configured to receive the fluid stream and the liquid contacting stream and to provide a mixed, two-phase flow having a vapor phase and a liquid phase;
  a separator proximate the second end of and in-line with the mass transfer vessel, configured to receive the two-phase flow from the mass transfer vessel and then separate the vapor phase from the liquid phase;
  a gas outlet at the at the separator configured to release the vapor phase as a treated gas stream; and
  a liquid-phase outlet at the separator configured to release the liquid phase as a loaded treating solution;
  wherein the separator is designed to separate fluid components without substantially relying upon gravity separation.

* * * * *